(12) United States Patent
Nishikawa

(10) Patent No.: US 7,804,630 B2
(45) Date of Patent: Sep. 28, 2010

(54) IMAGE PROCESSING APPARATUS AND IMAGE PROCESSING METHOD

(75) Inventor: Naoyuki Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 11/623,855

(22) Filed: Jan. 17, 2007

(65) Prior Publication Data

US 2007/0177173 A1 Aug. 2, 2007

(30) Foreign Application Priority Data

Jan. 31, 2006 (JP) .............................. 2006-023627
Dec. 22, 2006 (JP) .............................. 2006-346655

(51) Int. Cl.
- H04N 1/60 (2006.01)
- G06F 3/12 (2006.01)
- G06K 9/00 (2006.01)
- G06T 15/50 (2006.01)
- G09G 5/02 (2006.01)

(52) U.S. Cl. ....................... 358/518; 358/1.13; 358/1.1; 358/1.9; 358/520; 382/162; 382/167; 345/600; 345/426; 345/593

(58) Field of Classification Search ................ 358/1.13, 358/1.11, 1.1, 1.9, 518, 1.15, 520; 382/162, 382/167; 345/600, 426, 593

See application file for complete search history.

(56) References Cited

U.S. PATENT DOCUMENTS

| 5,321,797 | A | | 6/1994 | Morton ........................ 395/131 |
| 5,323,249 | A | | 6/1994 | Liang .......................... 358/518 |
| 5,987,229 | A | * | 11/1999 | Bender et al. ............... 358/1.15 |
| 6,226,011 | B1 | * | 5/2001 | Sakuyama et al. .......... 345/600 |
| 7,142,711 | B2 | * | 11/2006 | Goto et al. ................... 382/167 |
| 2002/0118380 | A1 | | 8/2002 | Krueger et al. ............... 358/1.9 |
| 2003/0117636 | A1 | | 6/2003 | Nishikawa ................... 358/1.9 |

FOREIGN PATENT DOCUMENTS

| EP | 0 273 398 | 6/1988 |
| EP | 0 924 654 | 6/1999 |

* cited by examiner

*Primary Examiner*—Charlotte M Baker
(74) *Attorney, Agent, or Firm*—Fitzpatrick, Cella, Harper & Scinto

(57) ABSTRACT

An object of an input print job is discriminated, and color conversion processing is applied to the object of the print job based on the discrimination result and information which is set in correspondence with the print job and is used to designate color conversion processing. When the object is a transparent object, the color conversion processing is executed on a rendering color space, and when the object is a gradation object, the color conversion processing is executed on a device color space.

13 Claims, 21 Drawing Sheets

FIG. 5A
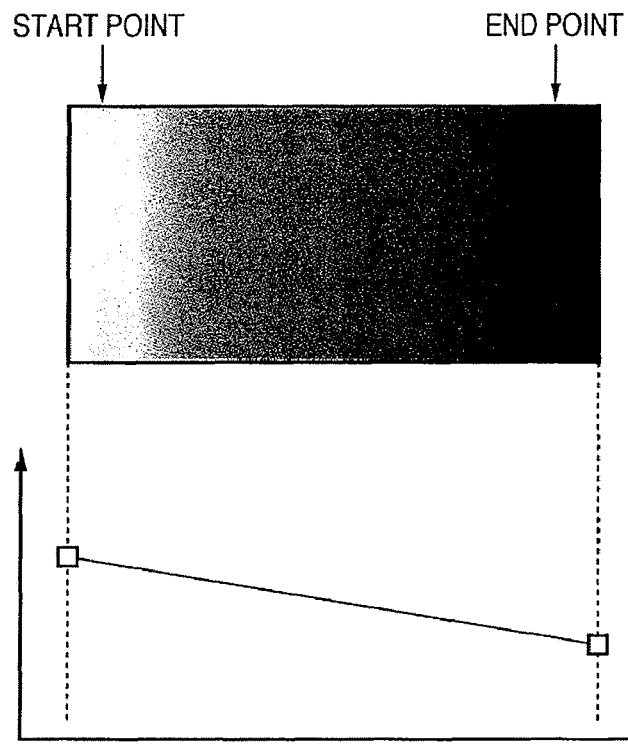
FIG. 5B
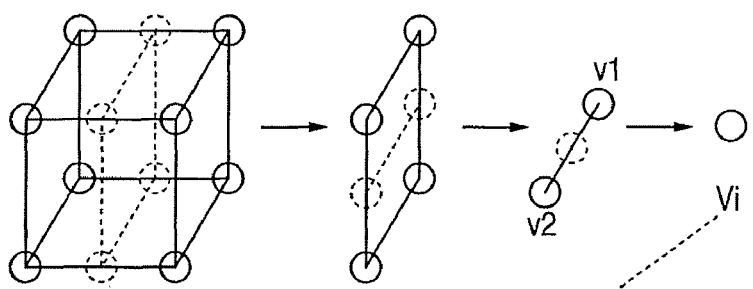
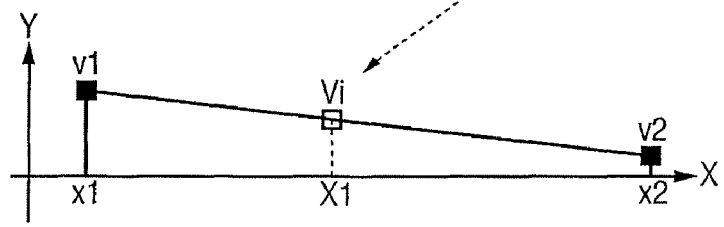

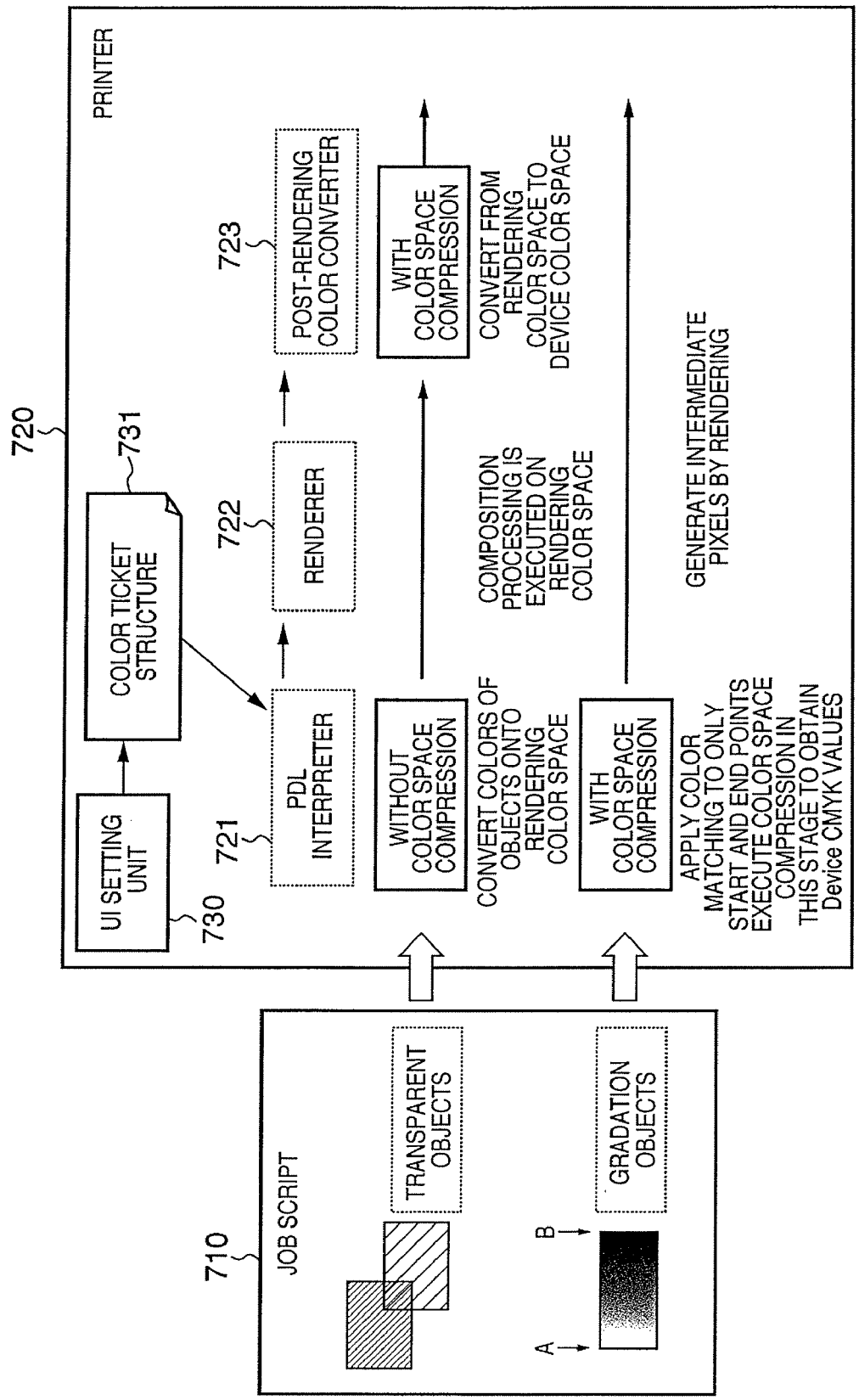

IMAGE PROCESSING APPARATUS AND IMAGE PROCESSING METHOD

BACKGROUND OF THE INVENTION

1. Field of the Invention

The present invention relates to an image processing apparatus and an image processing method which rasterize text and graphic data or renders natural image data such as photos and the like.

2. Description of the Related Art

Color data which is handled in a color printer or the like that prints graphic data or image data is given as RGB values designated by a color mode or command in the case of graphic data, and in an RGB dot-sequential or RGB frame-sequential format in the case of image data. A color space used to handle color data is not limited to RGB, and a YMC color space unique to a color printer (depending on ink properties), an XYZ color space defined by the CIE, or the like may be used.

In any case, upon execution of printing inside the color printer, input color data undergoes color reproduction processing (e.g., conversion from RGB to YMCK) corresponding to a color space defined in the color printer, thus making an actual printout.

In general, if the color printer considers color matching with color data to be handled by another device, one reference color space is defined to execute color correction that matches illuminant (color) characteristics with the other device. The other device includes, e.g., a color scanner or a color display such as a CRT or the like.

In this case, the color printer executes its internal color processing in correspondence with the reference color space. For example, the color printer can faithfully reproduce an image to be displayed on the color printer even when it outputs that image.

For example, in order to handle identical color data by devices such as a color scanner, color display, color printer, and the like, a reference color space, i.e., a device-independent color space is defined to convert color data onto each device-dependent color space using color space conversion processing corresponding to each device. With this conversion, color matching can be implemented between devices.

In practice, since respective devices have different color reproduction ranges due to their essential physical characteristics, it is difficult to attain calorimetric matches. However, in general, color correction which minimizes a color difference using a color difference formula represented by CIE1976 $L^*a^*b^*$ or the like has been proposed.

In a method of evaluating whether or not two colors expressed on different media like on a screen in the case of a color display and on a print sheet in the case of a color printer are equal to each other, many color difference formulas have been proposed. However, there is no absolutely established color difference formula, and most of these formulas are selectively used depending on their use purposes.

At the same time, there are some color reproduction methods, which are selectively used depending on their purposes. In consideration of the aforementioned color matching, different evaluation methods must inevitably be used depending on the purpose of the color reproduction. Especially, in a color printer, its internal color reproduction method becomes an important factor that influences the image quality of printed materials to be output.

In general, as described above, an attempt has been made to apply correction that minimizes color difference using a CIE1976 $L^*a^*b^*$ color difference formula or the like. This method is effective when a color printer performs color reproduction of color data scanned by a color scanner. This is because the source medium is a reflective document (colors reproduced on a paper sheet), and it is relatively easy to reproduce such color data using inks of a printing apparatus. Since the reflective document and the color printer have basically the same physical color development schemes, color reproduction is easy to achieve compared to other media although there are problems of different ink properties and densities (gray balances).

However, illuminant colors on the screen of a color display have physical properties themselves different from those of the reflective document, and the color reproducibility that can be attained using a general color difference formula is limited. When an image to be output on such media is a natural image, color reproduction, so-called preferred matching, is often used. The preferred matching aims at achievement of preferred color reproduction for some important colors (e.g., human flesh color and the like) of the image apart from the viewpoint as to whether or not color matching between the reproduced image and original image is attained.

However, upon handling data such as a natural image, such color reproduction is effective. However, upon handling data such as a computer graphics (CG) image, color reproduction processing with disregard to color matching poses a problem.

Hence, if the color reproduction processing can be changed in correspondence with data to be processed, the aforementioned problems can be solved. Therefore, by selecting the color reproduction processing corresponding to data to be handled, a multi-color printing apparatus which can print out data with better image quality can be provided.

FIG. 1 is a block diagram showing principal processing associated with color processing in a conventional printer. As shown in FIG. 1, an input unit 101 temporarily stores input data, and sends that data to a data analyzer 102. The data analyzer 102 analyzes whether the input data is image data or CG data. More specifically, the data analyzer 102 recognizes the data format of the input data, and determines that the input data is image data if respective pixels have a given pixel size, and their RGB values line up in the dot-sequential format. On the other hand, if data represents the type of graphic, and the coordinate values, RGB data of color designated values, and the like line up in a format that matches its processing system, the data analyzer 102 determines that the input data is CG data.

The input data branches to a rasterize system suited to its processing based on the analysis result of the data analyzer 102. That is, if the analysis result of the data analyzer 102 indicates image data, the data analyzer 102 sends the input data to an image rasterize system 103. The image rasterize system 103 converts the input data into YMC data with reference to a color conversion processor 104 to rasterize it to rendering data, and renders the rendering data on a page buffer 107.

If the analysis result of the data analyzer 102 indicates CG data, the data analyzer 102 sends the input data to a CG rasterize system 105. The CG rasterize system 105 converts the input data into YMC data with reference to a color conversion processor 106 to rasterize it to rendering data, and renders the rendering data on the page buffer 107.

By contrast, SVG (Scalable Vector Graphic) objects that attach importance to display of graphic designs on a monitor include transparent graphics and gradation graphics. The transparent graphics and gradation graphics will be described in detail below with reference to the drawings. The transparent graphics will be described first.

FIG. 2 is a view for explaining the composition processing for compositing two graphic data. In general, a color overlapping part between images to be rendered can undergo arithmetic processing according to an arbitrary color mixing formula. In this example, assume that two rectangular objects 210 and 220 are input as images, one rectangular object 210 has α_CG1 as a transparent and composition attribute value, and the other rectangular object 220 has α_CG2 as transparent and composition attribute value. Since the transparent and composition attribute values of each graphic data are set for respective pixels which form the image, composite pixels can be calculated for respective pixels upon composition.

Since this overlapping part 242 and other parts 241 and 243 must undergo different types of color matching processing, decomposition processing into regions 231 to 233 is appropriately executed, as shown in FIG. 7. Such composition processing using the "transparent and composition attribute values" is often called "α blend".

A method of applying color matching to objects (graphics) to which α blend is to be applied will be described below. In general, the following two methods are used.

As the first method, a case will be described below wherein color matching processing (gamut mapping) is executed prior to a blend, as shown in FIG. 3. A PDL (page description language) job includes information of respective graphics (objects) required to form a print page. In general, an arbitrary color space can be independently designated for each graphic. For example, assume that color space A of a given specification (for example, to be referred to as A-RGB color space hereinafter) is designated for the rectangular object 210 shown in FIG. 2, and color space B of another specification (likewise, to be referred to as B-RGB color space hereinafter) is designated for another rectangular object 220.

A device used to print the objects in the system is printer A, and an input color space to printer A is defined as an RGB color space (i.e., a device RGB color space).

Upon executing color conversion from a device-independent color space (e.g., XYZ, Lab, or the like) into a device color space, an ICC profile of printer A (e.g., conversion from XYZ into device RGB) is used.

The difference between the color spaces of the two rectangular objects shown in FIG. 2 can be adjusted to one color space (in this case, the device color space) using the ICC profile of printer A.

More specifically, for the rectangular object 210, the A-RGB color space is converted into the XYZ color space, which is then converted into the device color space of printer A using the ICC profile of printer A. At this time, color space compression (gamut mapping+color conversion) suited to the gamut of the printer device is executed. The same processing applies to the rectangular object 220 as in the rectangular object 210 to obtain device RGB values.

These conversions can adjust the color spaces of the two rectangular objects to be composited to one color space. The two objects undergo the composition processing on the same color space, i.e., the device RGB color space. The printer receives device RGB color space values after composition of the objects, and internally converts the device RGB color space into a printer color space CMYK, thus executing printout processing.

As the second method, a case will be described below wherein after the composition processing of objects (graphics) to which a blend is applied, color matching processing (gamut mapping) onto the device color space is executed. In this case, assume that as a PDL script or the definition of the system, a rendering color space is defined (the definition in this case is broad, e.g., a color space used to make operations such as composition and the like is also referred to as the rendering color space). Also, assume that as the rendering color space, a color space defined based on the specification of a display or the like is designated in place of a color space that defines the gamut of the printer (for example, a standard color space sRGB or the like).

As described above, the PDL (page description language) job includes information of respective graphics (objects) required to form a print page. In general, arbitrary color spaces can be independently designated for respective graphics.

Assume that color space A of a given specification (for example, to be referred to as A-RGB color space hereinafter) is designated for the rectangular object 210 shown in FIG. 2, and color space B of another specification (likewise, to be referred to as B-RGB color space hereinafter) is designated for another rectangular object 220.

As shown in FIG. 4, color conversion from the respective color spaces into a rendering color space is executed. In this case, if an sRGB color space is designated as the rendering color space, since no color space compression is required, color space conversion (linear conversion that influences a white point, chromaticity, γ, or the like) is simply executed. Next, the two rectangular objects are converted onto an identical color space (rendering color space), and then undergo composition processing. After that, the rendering color space is converted into a device color space (device RGB color space). At this time, the device color space undergoes color space compression (gamut mapping+color conversion) since the rendering color space and device color space have different gamuts.

The printer receives the device RGB color space values after composition of the respective objects, and internally converts this device RGB color space into a printer color space CMYK, thus executing printout processing.

Note that the aforementioned two types of methods (FIGS. 3 and 4) will be compared, and which method is to be preferably adopted will be examined. Assume that the operation of the composition processing is specified by the PDL. Under this assumption, a case will be examined below wherein the rendering result of the PDL job is to be output to a display or printer.

As the image processing, when the composition processing is executed on one rendering color space, and that composition result is supplied to each device, it is naturally assumed that the rendering color space is converted into the color space of that device. The composition processing is a kind of arithmetic operation, and the result of the composition processing differs if the composition processing is executed on different color spaces. Composition processing executed after conversion to the color space of the device results in an adverse influence on the processing.

Generally considered, the second method (FIG. 4), i.e., the method of performing color space compression to the device color space after the composition processing is preferable.

Next, a case will be explained below wherein an object includes a gradation, and processing for that gradation is executed. Note that "gradation" means that a graphic, i.e., some points of a region like a rectangle are defined, and the colors of end points are defined at a plurality of points. In this graphic, any intermediate color value is expressed by a change from one end point to another end point.

FIGS. 5A and 5B are views for explaining gradation processing. Upon applying the color matching processing to this gradation graphic, the following problem may often occur due to quantization errors produced by calculations. FIG. 5A shows a gradation object, and FIG. 5B schematically shows interpolation arithmetic processing using an eight-point interpolation method. This interpolation processing sequentially drops the number of dimensions, and finally obtains an interpolation result.

For example, a gradation object which changes from red to black from a start point to an end point will be examined. This color conversion must be done in accordance with a position Vi on a rendering line, as shown in FIG. 5B. At this time, if a change (v1−v2) in rendering position is smaller than a moving distance (x2−x1), i.e., the value (v1−v2) is relatively low, the color conversion result often does not have a desired value due to quantization errors by calculations.

This problem will be explained using FIGS. 6A and 6B, and this is the case wherein after the gradation object is rasterized into pixels on the RGB color space, respective RGB pixels are converted into CMYK values by color matching processing. CMYK pixel values suffer from the influence of quantization errors due to the color matching processing. That is, even when a change on the CMYK color space side must be a monotonic increase, it suffers quantization errors and often does not become a monotonic increase, as shown in FIG. 6A.

To solve this problem, for example, the color matching processing may be executed and color change values in the gradation may be interpolated on the device color space based on the color matching results at control points of the gradation.

A description will be given using FIG. 6B. That is, this is the case that the color matching processing is applied to only the end points of a gradation object, and intermediate pixels are then generated during CMYK rendering processing. If an image is formed on the CMYK color space under the precondition of the gradation, it can be formed while meeting a monotonic increase condition.

Hence, generally considered, in the case of the gradation, the method of FIG. 6B, i.e., the method of performing color space compression of only end points onto the device color space, and then generating intermediate pixels on the device color space is preferable.

In this way, when objects include a blend, processing is preferably done on the RGB color space (rendering color space); when objects include gradation, it is preferably done on the device CMYK color space (device color space). However, the conventional printing system does not consider this point.

As described above, if only one method is simply adopted, not all print requests are satisfied. There is room for consideration of an apparatus arrangement for implementing a variety of processes, e.g., when high-speed printing is to be executed, and when a job is processed using multi-threads, and only the RGB color space is to be used as a rendering color space.

SUMMARY OF THE INVENTION

The present invention has been made to solve the aforementioned problems, and has as its object to set different types of color conversion processing for print jobs so as to attain processing suited to the objects.

In order to achieve the above object, according to one aspect of the present invention, there is provided an image processing apparatus comprising: discrimination means for discriminating an object of an input print job; and color conversion processing means for performing color conversion processing to the object based on a result of the discrimination means and information which designates color conversion processing set for each print job, wherein, when the object is a transparent object, the color conversion processing unit executes the color conversion processing on a rendering color space, and when the object is a gradation object, the color conversion processing unit executes the color conversion processing on a device color space, and when the object is the gradation object, the object is divided into a plurality of objects, color matching processing is applied to end points of the divided objects, and intermediate pixels are formed on the device color space.

According to one aspect of the present invention, there is provided an image processing method of an image processing apparatus comprising: a discrimination step of discriminating an object of an input print job; and a color conversion processing step of applying color conversion processing to the object based on a result in the discrimination step and information which designates color conversion processing set for each print job, wherein the color conversion processing step includes a step of executing, when the object is a transparent object, the color conversion processing on a rendering color space, and executing, when the object is a gradation object, the color conversion processing on a device color space, and when the object is the gradation object, the object is divided into a plurality of objects, color matching processing is applied to end points of the divided objects, and intermediate pixels are formed on the device color space.

According to one aspect of the present invention, there is provided an image processing apparatus comprising: means for performing color matching processing to a data group corresponding to a gradation object; means for detecting a trend changing of color to the data group based on a result of the color matching processing, and for obtaining an intermediate pixel by an interpolation calculation from the data group; and means for correcting a value of the intermediate pixel when the value of the intermediate pixel does not monotonically increase or decrease according to the trend changing.

According to one aspect of the present invention, there is provided an image processing method comprising: a step of performing color matching processing to a data group corresponding to a gradation object; a step of detecting a trend changing of color to the data group based on a result of the color matching processing to obtain an intermediate pixel by an interpolation calculation from the data group; and a step of correcting a value of the intermediate pixel when the value of the intermediate pixel does not monotonically increase or decrease according to the trend changing.

Further features of the present invention will become apparent from the following description of exemplary embodiments with reference to the attached drawings.

BRIEF DESCRIPTION OF THE DRAWINGS

FIGS. 5A and 5B are views for explaining gradation processing;

FIG. 7 is a view showing a method of processing a print job by a multi-color printing apparatus (printer) according to the first embodiment;

DESCRIPTION OF THE EMBODIMENTS

Figure 1:
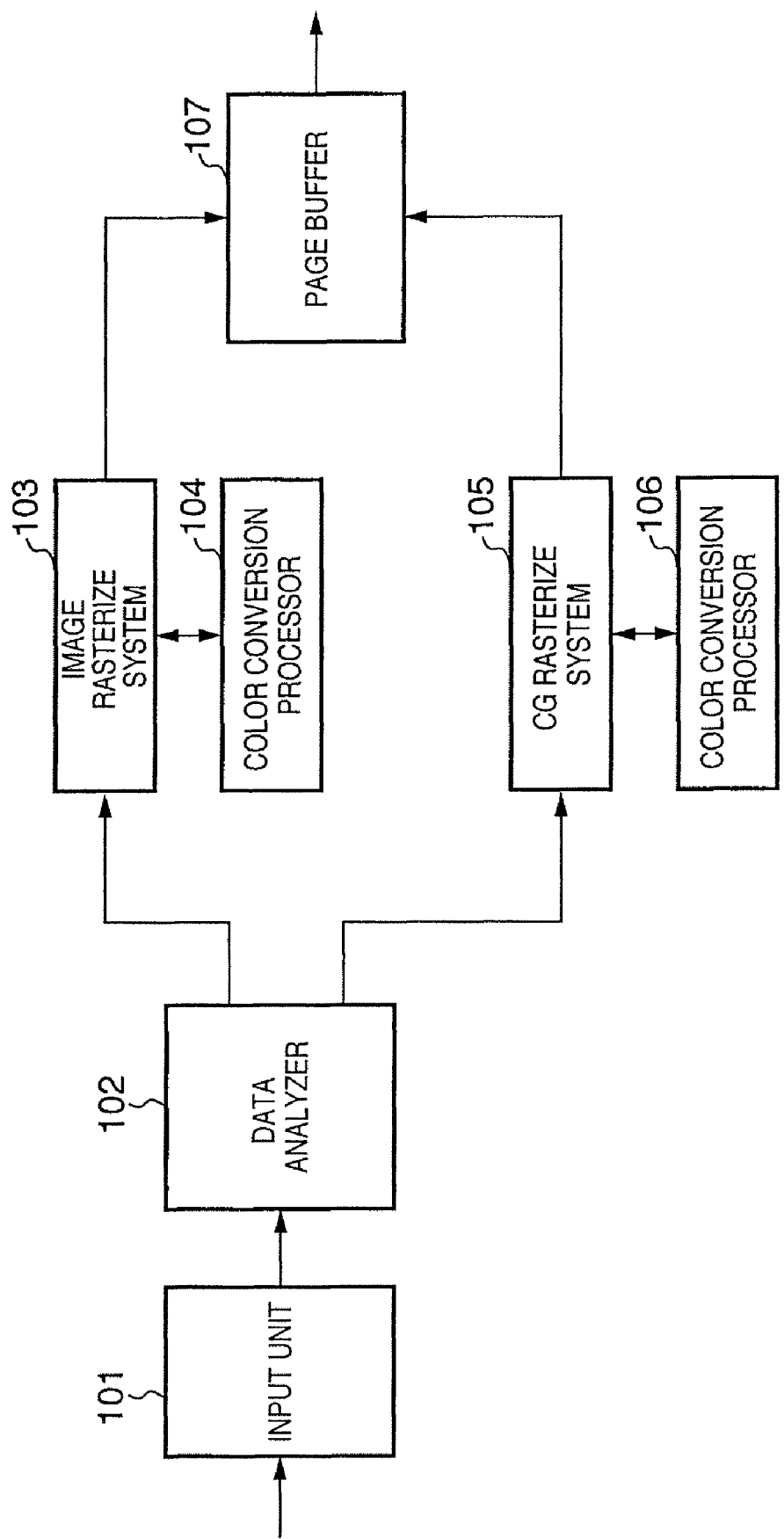
FIG. 1 is a block diagram showing principal processing associated with color processing in a conventional printer.
Figure 2:
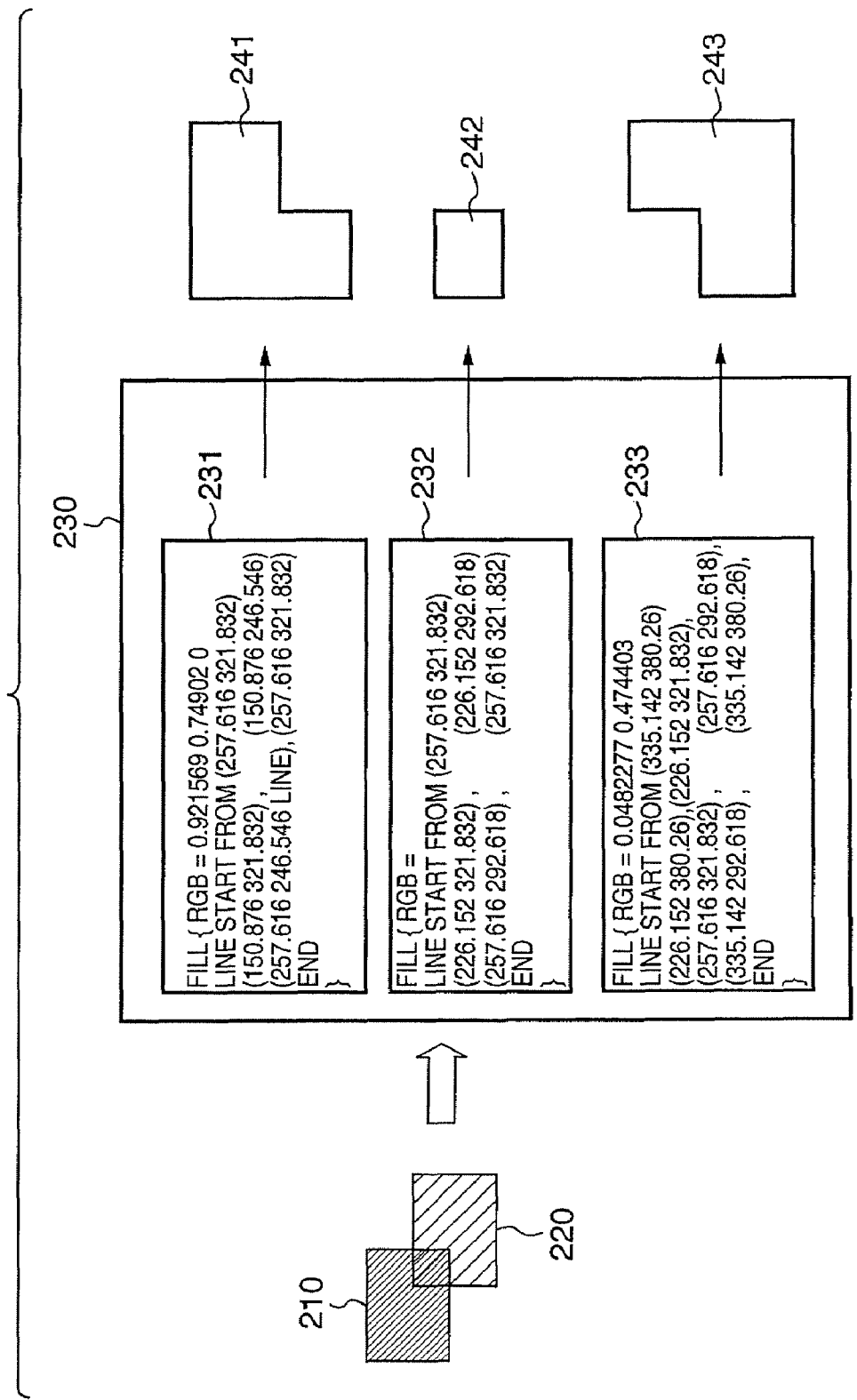
FIG. 2 is a view for explaining composition processing for combining two graphic data.
Figure 3:
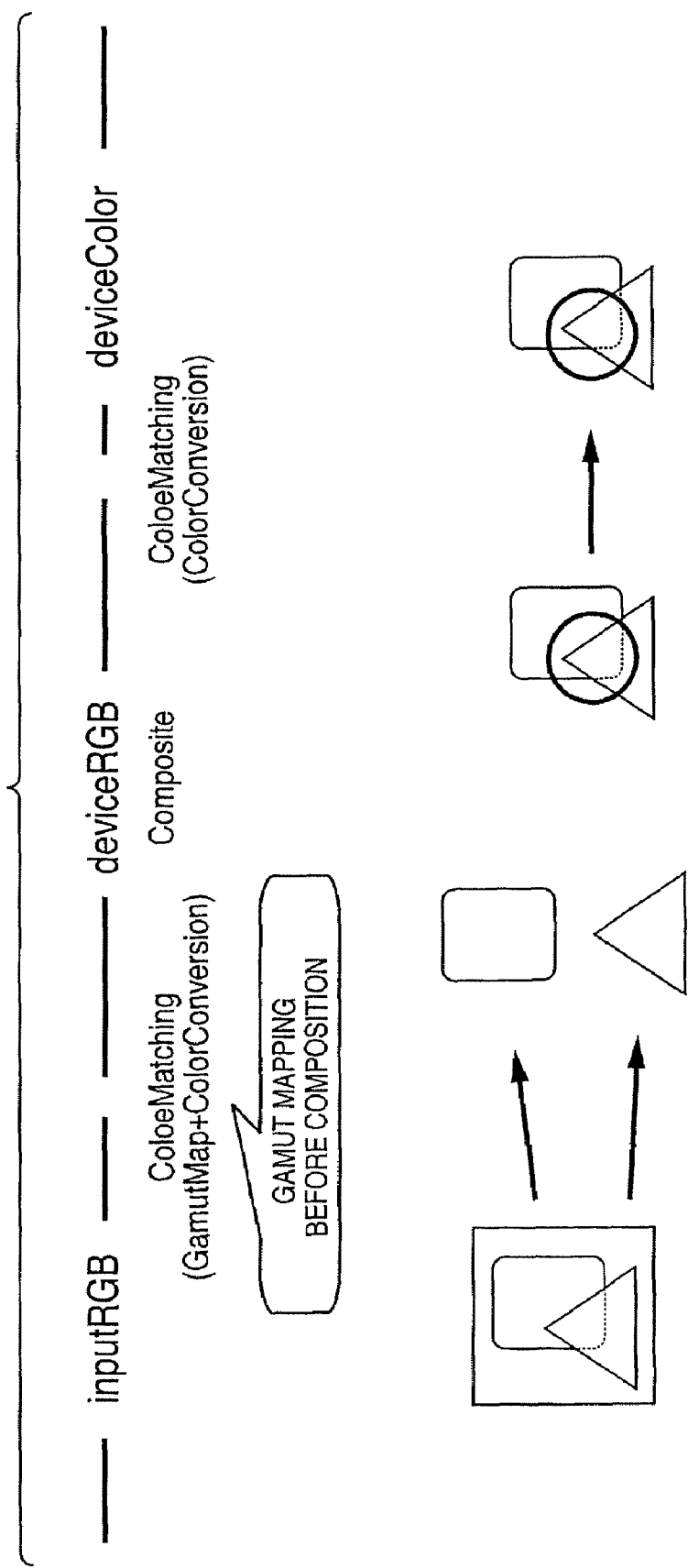
FIG. 3 is a view showing an example for executing color matching processing (color space compression) before composition of transparent graphics.
Figure 4:
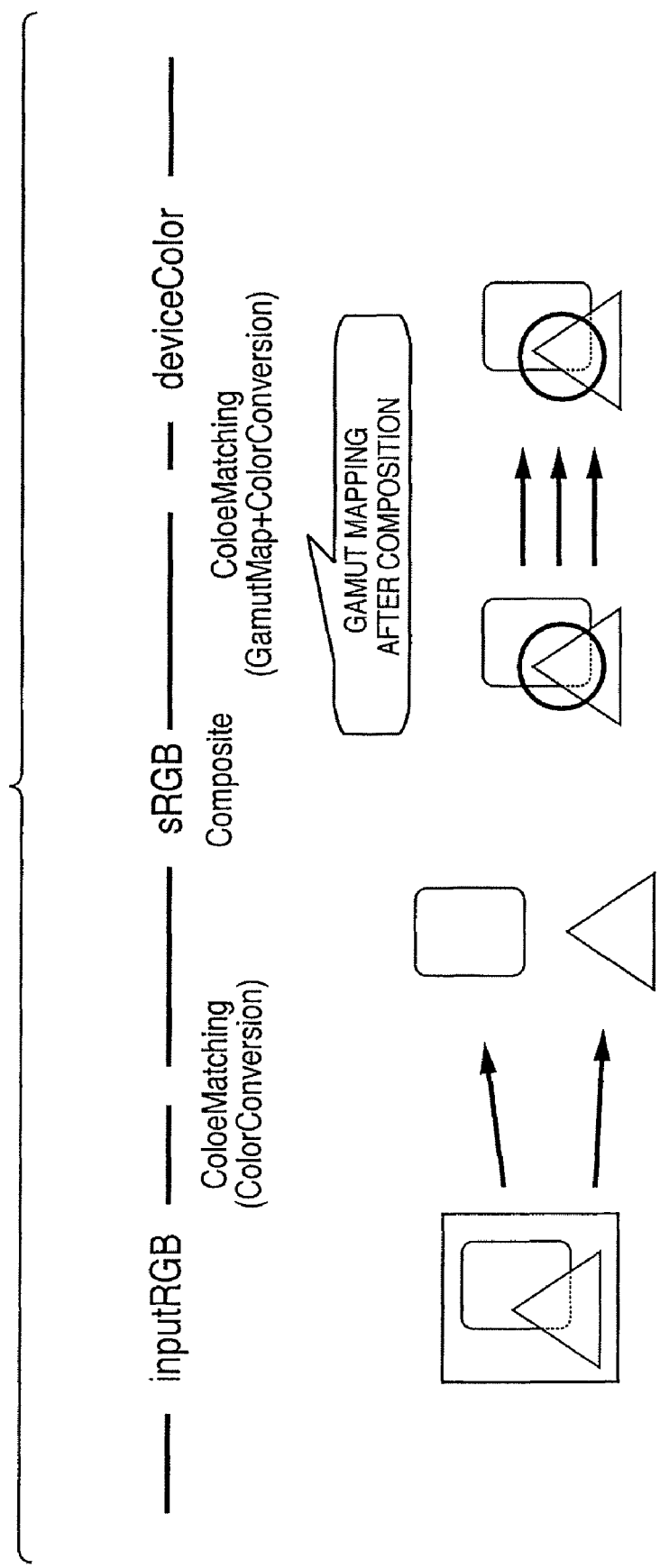
FIG. 4 is a view showing an example for executing color matching processing (color space compression) after composition of transparent graphics.

The best mode of carrying out the invention will be described in detail hereinafter with reference to the accompanying drawings.

First Embodiment

FIG. 7 is a view showing a method of processing a print job by a multi-color printing apparatus (printer) according to the first embodiment. In FIG. 7, a print job is input into a printer 720 as a job script 710. One color ticket structure 731 is issued for one job script 710, and is appropriately passed to required modules such as a PDL interpreter 721, renderer 722, post-rendering color converter 723, and the like.

When transparent objects (α blend objects) are passed to the PDL interpreter 721, the colors of the objects are converted onto a rendering color space (without application of color space compression/color matching). Next, the renderer 722 internally executes composition processing on the rendering color space (e.g., S-RGB, Adobe-RGB, or the like). The post-rendering color converter 723 executes color conversion from the rendering color space into the device color space (e.g., printer-dependent CMYK color space) (the color space compression is applied here).

On the other hand, in the case of a gradation object, the PDL interpreter 721 executes color matching processing for only end points. In this stage, only the end points (i.e., A and B) of the gradation object undergo the color space compression onto the device color space to obtain the printer-dependent device CMYK values, which are passed to the renderer 722. The renderer 722 generates intermediate pixel values based on the CMYK values at the end points A and B upon executing a rendering command of the gradation. For example, the renderer 722 calculates intermediate pixel values while making calculations such as linear interpolation or the like. Note that the need for the processing of the post-rendering color converter 723 can be obviated for the gradation object.

Individual objects undergo different kinds of processing, whose operations are controlled with reference to the color ticket structure 731 which is generated based on information designated by a user from a UI setting unit 730. Respective processors (PDL interpreter 721, renderer 722, and post-rendering color converter 723) appropriately read the information of the color ticket structure 731, and use it to control the operations in the respective kinds of processing. This color ticket structure is a structure which describes whether the color space compression is applied to each object by the PDL interpreter 721, or whether the color conversion processing is applied to each object by the post-rendering color converter 723. Note that the color ticket structure is issued on the basis of a user instruction by using a user interface (to be described later) shown in FIG. 9.

The practical processing of a print job to be executed in the printer according to the first embodiment will be described in detail below using FIG. 8.

Figure 8:
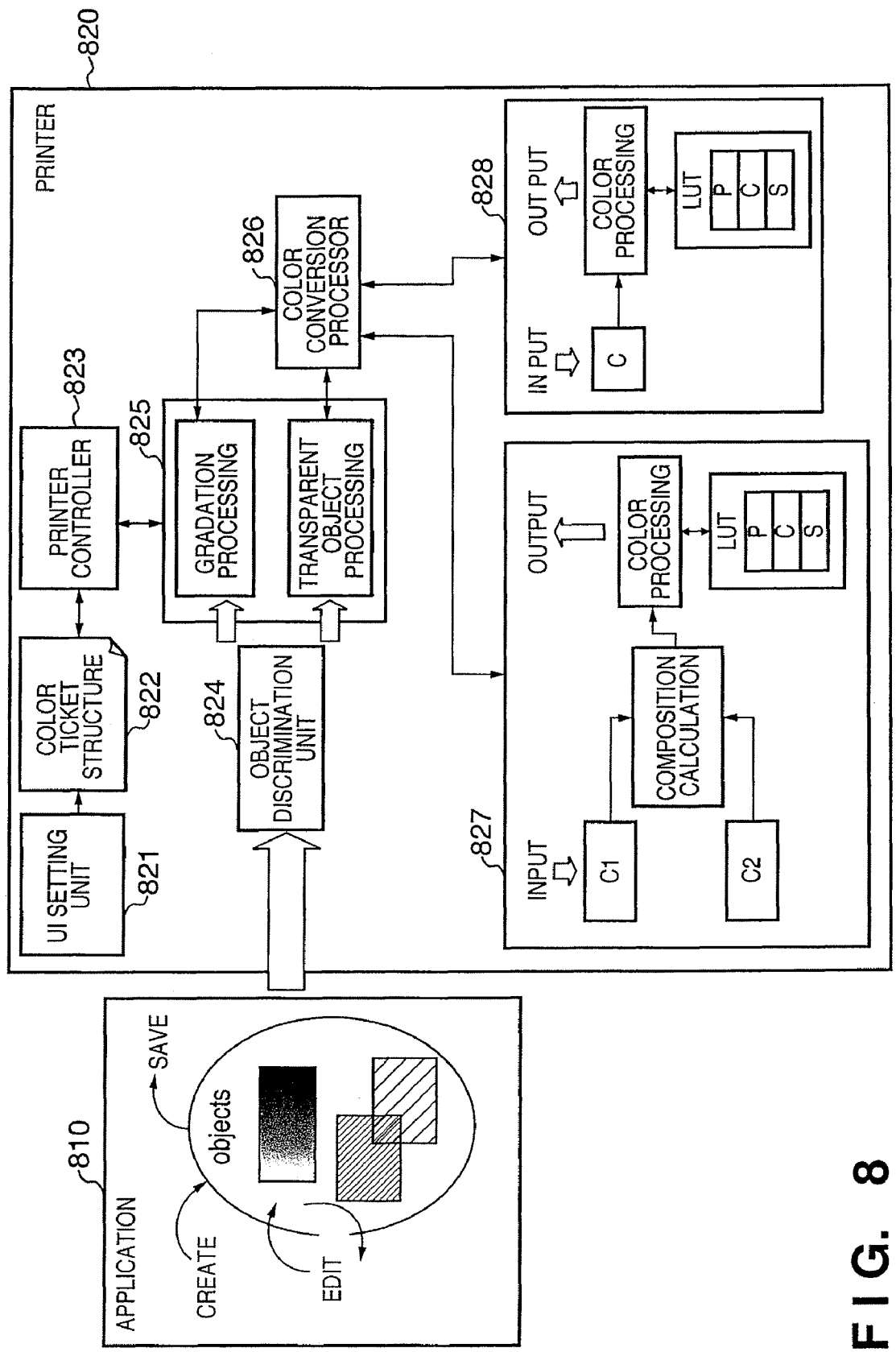
FIG. 8 is a block diagram showing an example of the arrangement of the printer according to the first embodiment.

FIG. 8 is a block diagram showing an example of the arrangement of the printer according to the first embodiment. Referring to FIG. 8, a print job generated by an application 810 is transferred to a printer 820 via a network or the like (not shown). The printer 820 includes an object discrimination unit 824 for discriminating an object for each of the PDL interpreter 721, renderer 722, and post-rendering color converter 723. The object discrimination unit 824 discriminates whether the object of interest is a transparent object or gradation object. Each object data is appropriately transferred to a processor 825.

The processor 825 appropriately calls a color conversion processor 826 for color matching processing. The color conversion processor 826 can switch its processing contents on a timely basis under the control of a printer controller 823.

For example, upon processing transparent objects, or upon requiring calculations of composite colors, the color conversion processor 826 calls conversion processing 827. On the other hand, upon executing color conversion for one color of, e.g., end points of a gradation object, the color conversion processor 826 calls conversion processing 828. The conversion processing 827 executes transparent processing and composition processing of input objects C1 and C2 based on an LUT, and outputs them after color matching processing. On the other hand, the conversion processing 828 applies color matching processing to input object C based on an LUT, and outputs the processed object.

The printer controller 823 determines its control according to information of a color ticket structure 822. The color ticket structure 822 is set based on information from a UI setting unit 821 of the printer 820, and is used to switch the processing contents of the color conversion processor 826.

The arrangement of a print processing block of the printer 820 and the setting dialog of the UI setting unit 821 according to the first embodiment will be described below using FIG. 9.

Figure 9:
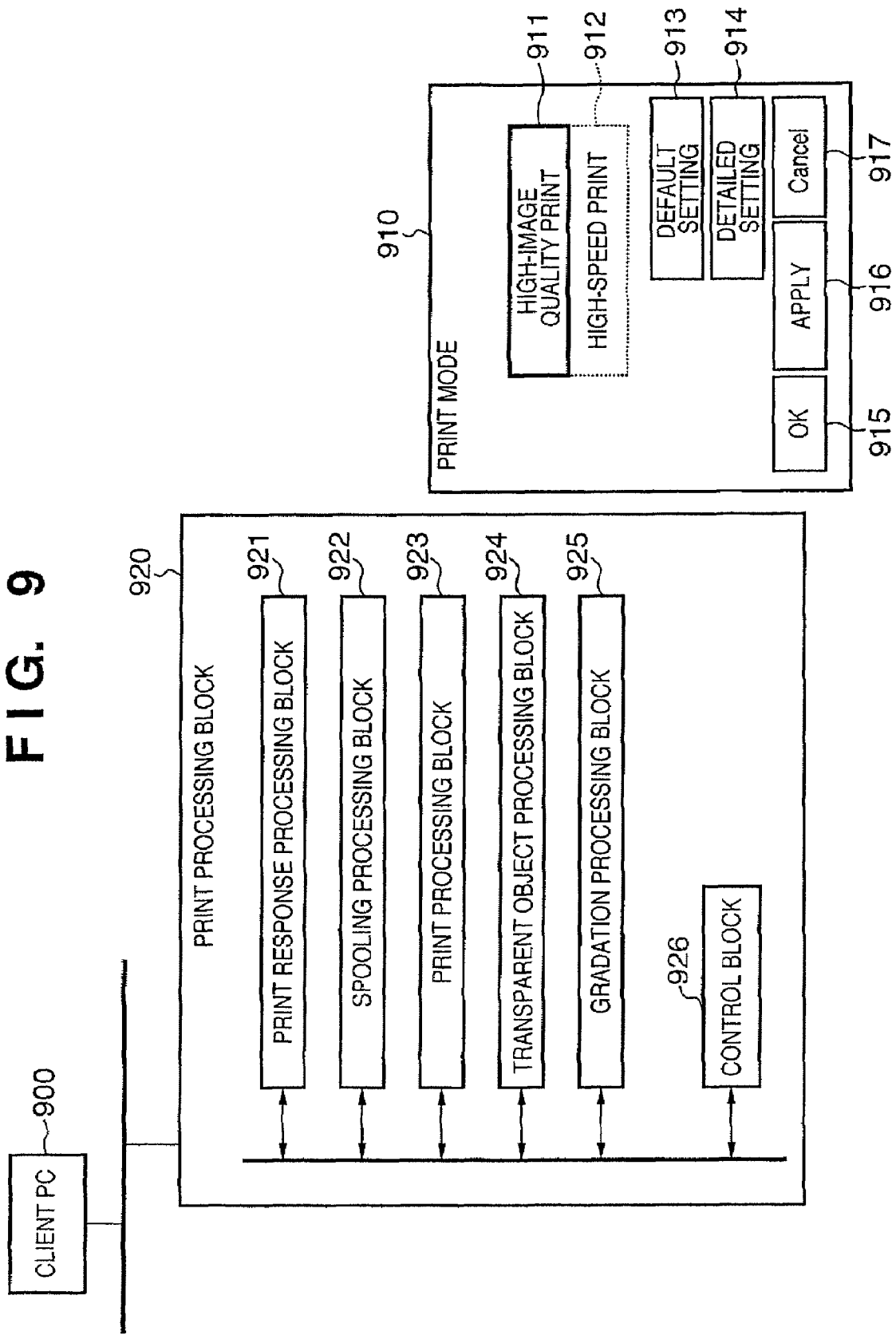
FIG. 9 shows an example of the arrangement of a print processing block and a setting dialog according to the first embodiment.

FIG. 9 shows an example of the arrangement of the print processing block and setting dialog according to the first embodiment. A print job from a client PC 900 is output to a print processing block 920, and data is output to an engine unit (not shown) via internal processing of the print processing block 920.

As shown in FIG. 9, the print processing block 920 includes some internal processing blocks. A print response processing block 921 returns a response to a print request from the client PC 900 which is input via the network or the like, and executes reception processing of print data sent from the client PC 900. Next, a spooling processing block 922 temporarily stores the print data received by the print response processing block 921 in a spooling area.

A print processing block 923 executes image formation processing required to print the print data after it executes the analysis processing for the print data. A transparent object processing block 924 and gradation processing block 925 execute calculation processing of a blend and gradation included in the print data. A control block 926 controls the processes of the transparent object processing block 924 and gradation processing block 925 in accordance with a print mode (to be described later).

Reference numeral 910 denotes a user interface which provides the print mode to the user, and is displayed on a setting dialog of the UI setting unit 821. In the example of FIG. 9, the user interface 910 displays respective instruction buttons of "high-image quality print mode" 911, "high-speed print mode" 912, "default setting" 913, "detailed setting" 914, "OK" 915, "apply" 916, and "cancel" 917.

When the user selects the high-image quality print mode 911, the control block 926 applies the RGB color space as the rendering color space to a blend objects. The control block 926 renders data to a bitmap for each pixel on the RGB color space. The bitmapped data undergoes the color space compression, and is converted onto a CMYK color space as a device color space.

On the other hand, the color space compression is first applied to a gradation object. After conversion onto the device CMYK color space (device color space), the rendering processing is applied to obtain a bitmap for each pixel. When the user selects the high-speed print mode 912, the control block 926 applies only the RGB color space as a rendering color space.

According to the first embodiment, the color space can be switched using the color ticket structure like that the RGB color space (rendering color space) is applied to a blend objects, and the device CMYK color space (device color space) is applied to a gradation object.

In the high-speed print mode, the color space compression is applied to both the α blend object and the gradation object by using the RGB color space as the rendering color space after the rendering processing. In either case, the rendering color space compression can be applied as described above by issuing a color ticket structure with different settings with respect to the print job of interest.

Second Embodiment

The second embodiment of the present invention will be described in detail hereinafter with reference to the accompanying drawings. As the processing for a gradation object, the first embodiment executes color matching for only end points, and then generates intermediate pixels during the CMYK rendering processing. In this way, if a gradation image is formed on the CMYK color space, it can be formed to meet, e.g., the monotonic increase (decrease) condition of a change in color signal from one end point to another end point of the gradation.

However, strictly speaking in a method of the first embodiment, since a change in gradation is defined on a color space in a PDL job script, a change in color of the gradation command on the rendering color space is not always expressed on the device color space after color space compression. That is, if intermediate pixels are generated using linear interpolation or the like on the device color space (e.g., CMYK), faithful color reproduction cannot be made.

To solve this problem, the second embodiment appropriately divides a gradation object, and applies color matching processing to the end points for each divided object.

Figure 10:
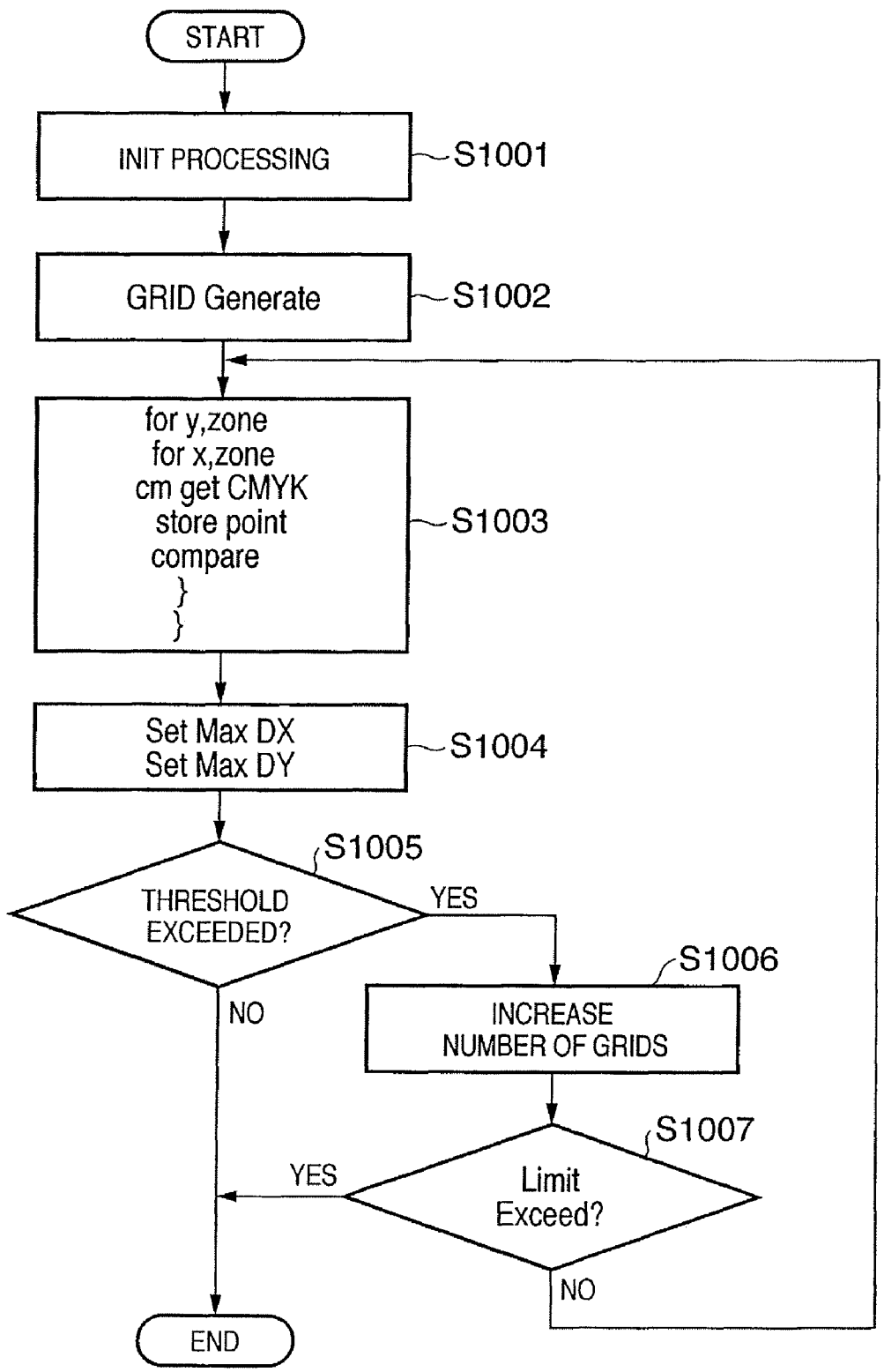
FIG. 10 is a flowchart showing the division processing of a gradation object.

FIG. 10 is a flowchart showing the division processing of a gradation object. Initialization processing is executed in step S1001, and grid generation processing is executed in step S1002. For example, a UI setting unit (to be described later) allows the user to set the division resolution of the gradation object. In this step, the number of grids is determined based on the resolution designated value and the size upon rasterizing the object to be processed. More specifically, if the user designates 10 DPI in the vertical and horizontal resolutions, and if the size after rasterization of the gradation object is 600 DPI and is 300 pixels in a printer, an image having a size of 5 inches is formed. In this case, the expected gradation resolution is 10 DPI, the number of divisions is 50 as an appropriate value.

In step S1003, device CMYK values are calculated as color matching values at an end point for each grid. At this time the calculated CMYK values of the grid point and difference values DXi and DYi from vertically and horizontally neighboring grid points are recorded. Then, DXi and DYi are compared with maximum values (DMX, DMY) of the difference values, and when the DXi and DYi exceed the maximum values of the difference values, DMX and DMY are appropriately updated. The aforementioned processing is applied to all the grids.

In step S1004, the maximum values (DMX, DMY) of the difference values are substituted in DX and DY. In step S1005, DX and DY are compared with a threshold designated by the UI setting unit (to be described later). If one of DX and DY exceeds the threshold, the flow advances to step S1006 to re-divide grids.

Note that the grids are re-divided based on the threshold. This is because when the difference values, i.e., the CMYK values between the grids change largely, a change in color in that region cannot keep linearity, and the current grids must be divided into smaller regions.

In step S1006, the number of grids is increased. For example, if the number of grids in the vertical and horizontal directions is 50, the number of grids=100 is set. It is checked in step S1007 if the number of grids which is set in step S1006 exceeds a grid limit value of the system. If the number of grids does not exceed the grid limit value, the process returns to step S1003 to repeat the aforementioned processing.

Note that an appropriate grid limit value is 300 in a printer of, e.g., about 600 DPI. Since it is estimated that image quality is visually adequate enough if the grid limit value ranges from about 200 to 300, the grid limit value is normally set to be 200.

The processing of a print job to be executed in the printer according to the second embodiment will be described in detail below using FIG. 11.

Figure 11:
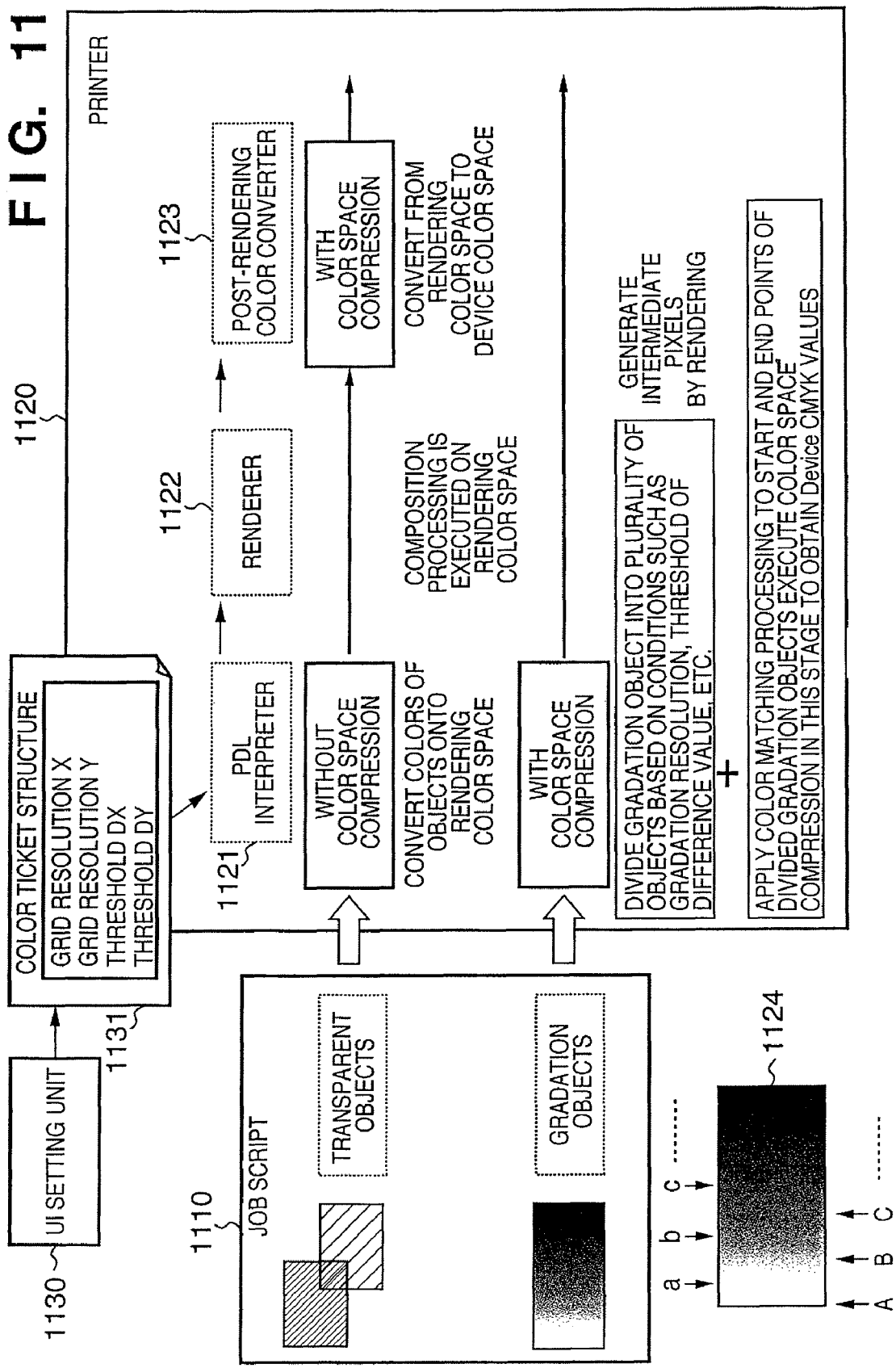
FIG. 11 is a view showing a method of processing a print job by a printer according to the second embodiment.

FIG. 11 is a view showing a method of processing a print job by the printer according to the second embodiment. In FIG. 11, a print job is input to a printer 1120 as a job script 1110. One color ticket structure 1131 is issued for each job, and is appropriately passed to required modules such as a PDL interpreter 1121, renderer 1122, post-rendering color converter 1123, and the like.

Transparent objects (a blend objects) are passed to the PDL interpreter 1121, and the colors of the respective transparent objects are converted onto a rendering color space (without color space compression). Next, the renderer 1122 internally executes composition processing on the rendering color space (e.g., S-RGB, Adobe-RGB, or the like). The post-rendering color converter 1123 executes conversion from the rendering color space into the device color space (e.g., printer-dependent CMYK color space) (the color space compression is applied here).

On the other hand, in case of a gradation object, the PDL interpreter 1121 executes re-division processing and color matching processing in this stage. In the re-division processing for the gradation object, as has been described above using FIG. 10, the object is divided based on the condition such as the gradation resolution, the above-described threshold of the difference values, and the like. Note that the color ticket structure 1131 stores information of the gradation resolution, the threshold of the difference values, and the like. The PDL interpreter 1121 applies the color space compression to the end points of each divided gradation object (grid) to obtain device CMYK values as the result of the color space compression. All of the compressed CMYK values are passed to the renderer 1122.

The renderer 1122 generates intermediate pixel values based on the CMYK values at the end points upon executing a rendering command of the gradation. For example, the renderer 1122 calculates intermediate pixel values while making calculations such as linear interpolation or the like. Note that the need for the processing of the post-rendering color converter 1123 can be obviated for the gradation object.

With this processing, as denoted by reference numeral 1124 in FIG. 11, the end point of each divided gradation object can undergo faithful color reproduction. The intermediate pixels between two end points of a gradation object can undergo more faithful color reproduction than in the first embodiment, thereby simultaneously achieving monotonic change in color.

The two objects, i.e., the transparent object and gradation object undergo different kinds of processing, whose operations are controlled with reference to the color ticket structure 1131. Respective processors (PDL interpreter 1121, renderer 1122, and post-rendering color converter 1123) appropriately read the information of the color ticket structure 1131, and use it to control the operations in the respective kinds of processing.

The color ticket structure 1131 is generated based on information from a UI setting unit 1130 as in the first embodiment.

The arrangement of a print processing block in the printer 1120 and setting dialogs of the UI setting unit 1130 in the second embodiment will be described below using FIGS. 12 and 13.

Figure 12:
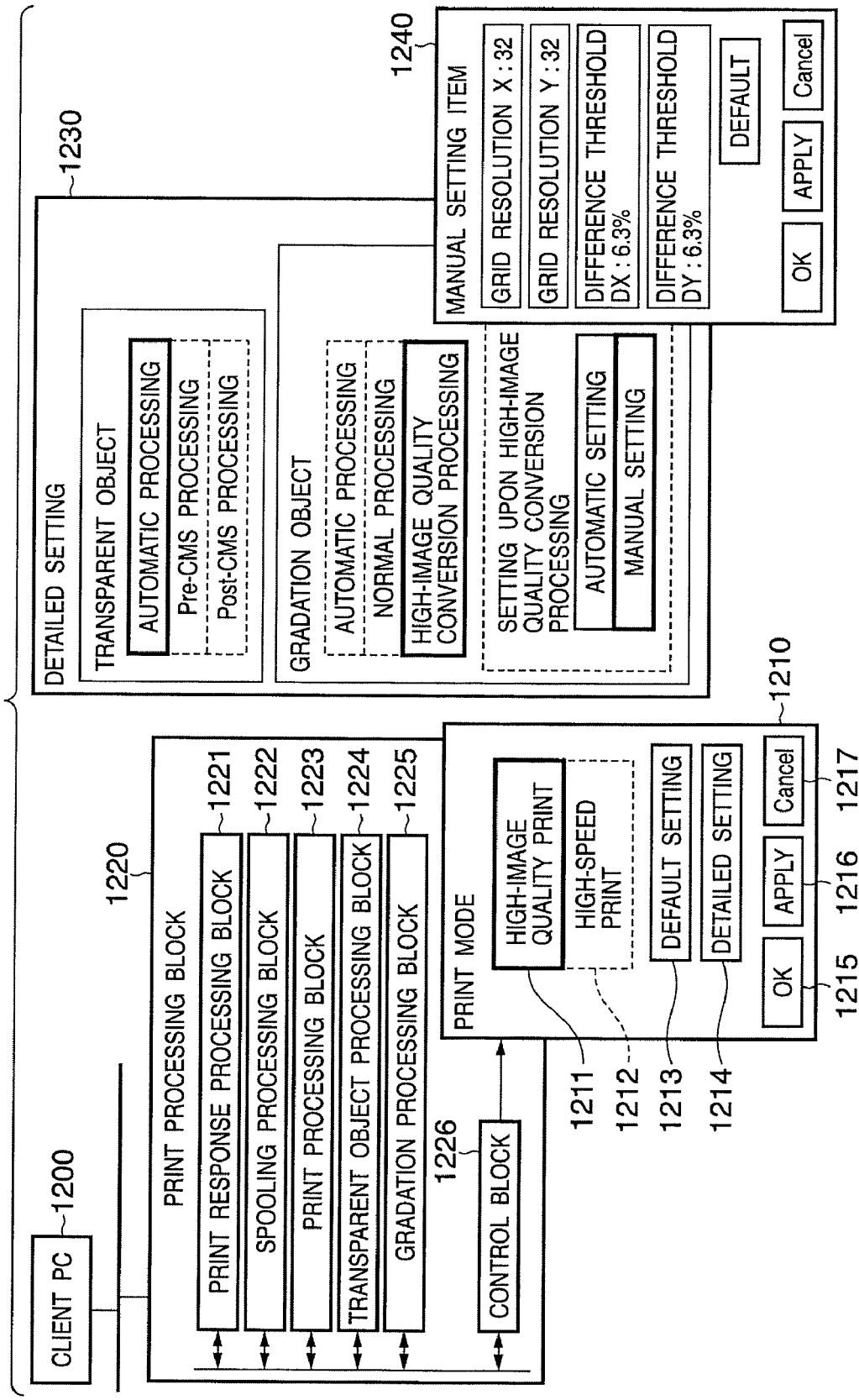
FIG. 12 shows an example of the arrangement of a print processing block and setting dialogs according to the second embodiment.
Figure 13:
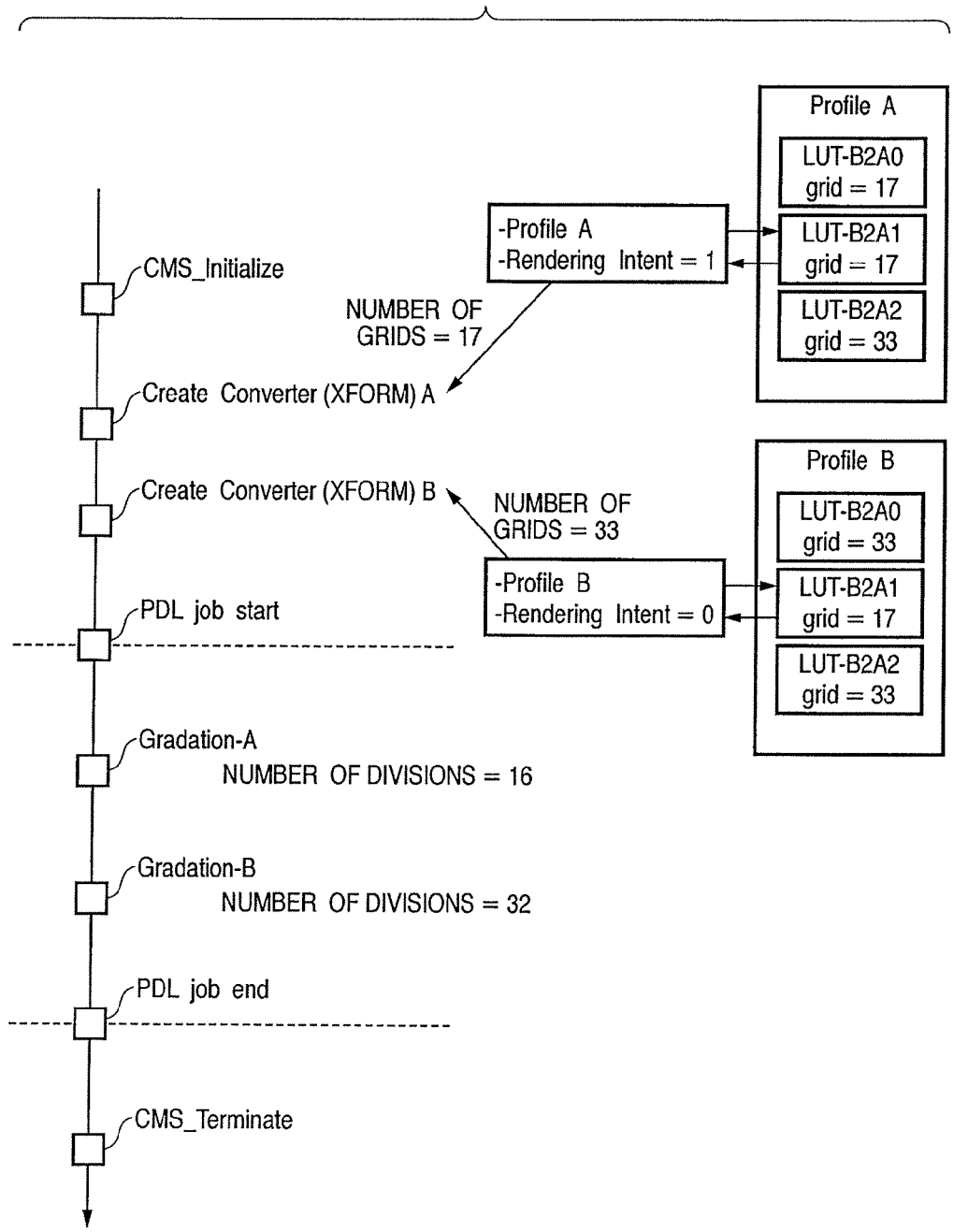
FIG. 13 shows a sequence for determining the number of divisions based on the number of grids of an LUT of a profile upon selection of an automatic setting.

FIG. 12 shows an example of the arrangement of a print block and setting dialogs in the second embodiment. The arrangement of a print processing block 1220 shown in FIG. 12 is the same as that of the first embodiment described using FIG. 9, and a description thereof will be omitted. Also, a setting dialog 1210 used to set the print mode is the same as that in the first embodiment. However, the second embodiment further displays detailed setting dialogs to allow the user to customize settings.

As shown in FIG. 12, upon pressing of a detailed setting button 1214, a detailed setting item dialog 1230 is displayed. This dialog allows the user to select a color matching mode for transparent objects and a gradation object. In this example, the user can select one of pre-CMS processing, post-CMS processing, and automatic processing for transparent objects. In the pre-CMS processing, the renderer 1122 executes the color space compression before rendering processing. In the post-CMS processing, the renderer 1122 executes the color space compression after the rendering process. The user can also select one of normal processing, high-image quality conversion processing, and automatic processing for a gradation object. In the state of this example, the user selects the automatic processing for transparent objects, and the high-image quality conversion processing for a gradation object.

Furthermore, upon selection of the high-image quality conversion processing for a gradation object, the user can select automatic or manual settings, as shown in FIG. 12. When the user further selects manual settings, a manual setting item dialog 1240 is displayed, as shown in FIG. 12, and allows the user to set the grid resolution and the threshold of difference values upon execution of gradation processing.

On the other hand, upon selection of the automatic settings, the number of divisions is determined based on the number of grids of an LUT in a profile such as an ICC profile used in the color space compression processing. This processing will be briefly described below using the sequence chart shown in FIG. 13. Converter objects (contexts for color matching) A and B for color matching are prepared. These converter objects are respectively assigned profiles A and B. As rendering intents, 1 and 0 are respectively assigned.

Upon accessing an actual profile, the number of grids of an LUT of interest is obtained, and this information is stored in the corresponding converter object. In FIG. 13, the numbers of grids=17 and 33 are assigned.

When processing for a PDL job starts, and color matching is applied to the gradation object, the information of the number of grids can be obtained from each converter object. In this stage, the number of divisions of the gradation object is calculated as the number of grids−1.

A rendering system appropriately divides the gradation object by the designated number of divisions to form gradation objects. The example shown in FIG. 13 instructs gradation A to use converter object A. In this converter object A, since the number of grids of the profile is 17, the number of divisions of the gradation object is 16.

According to the second embodiment, the gradation object is appropriately divided, and the color matching processing is applied to the divided end points, thus expressing a smooth slope of gradation.

Third Embodiment

The third embodiment of the present invention will be described in detail hereinafter with reference to the accompanying drawings. The third embodiment implements smoother gradation more satisfactorily than the second embodiment.

When linearity between a gradation color space (the color space of a PDL job script) and device color space is strong, no problem in terms of color reproducibility is posed if a gradation object undergoes rendering processing upon conversion into the device color space. Note that the gradation color space is the definition of a so-called rendering color space or gradation color space declared in the expression of a PDL or the like, and corresponds to, e.g., a monitor RGB color space. On the other hand, the device color space is, e.g., a device RGB or CMYK color space of a printer or the like.

However, when linearity is weak, in the processing of causing the gradation object to undergo color space compression on the device color space and intermediate pixel generation processing to generate intermediate pixels, there is high a possibility the generated gradation pixels may not have a strictly correct result from the viewpoint of color matching. In this way, the processing for forming gradation on the device color space is effective when the user demands smooth color change in gradation or high-speed print processing rather than the accuracy of color matching.

Figure 6A:
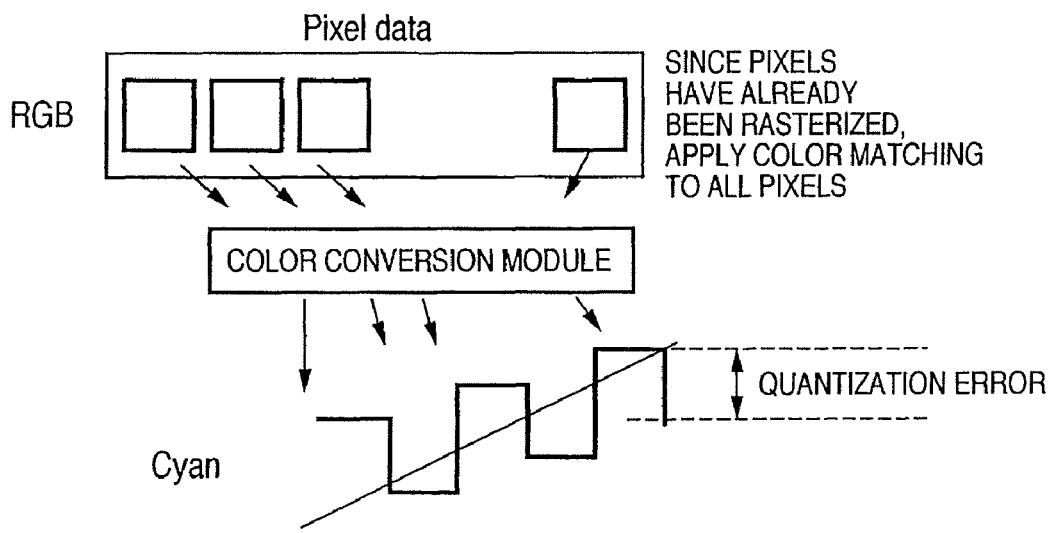
FIGS. 6A and 6B are views showing quantization errors in the gradation processing, and CMYK rendering processing.
Figure 6B:
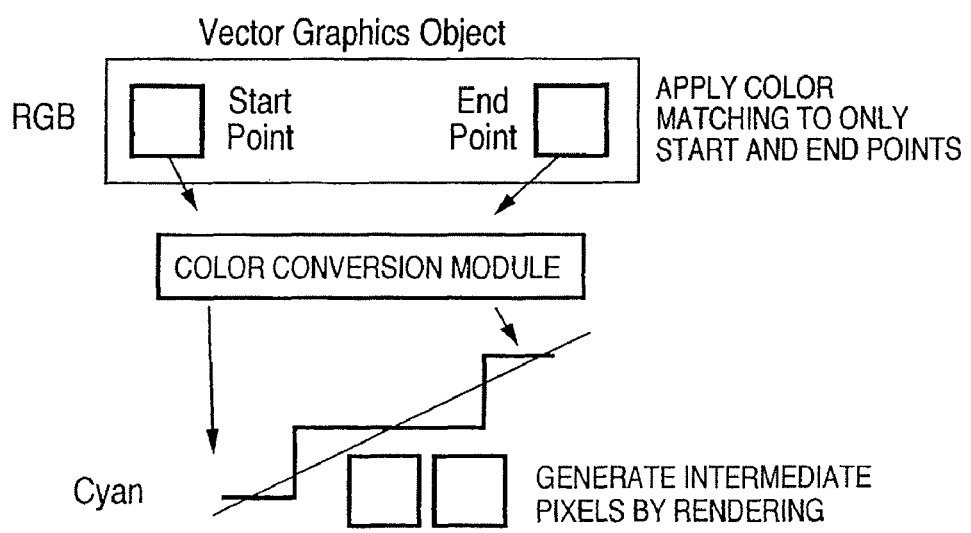

On the other hand, upon seeking more strictly correct colors from the viewpoint of color matching, a method of executing rendering processing on the gradation color space, forming gradation by the pixels which have undergone the rendering processing, and applying color matching to all pixels of this gradation is available. However, with method, image quality may deteriorate under the influence of quantization errors, as shown in FIG. 6A.

The cause of deterioration of image quality due to the influence of quantization errors will be described in more detail below using FIG. 14.

Figure 14:
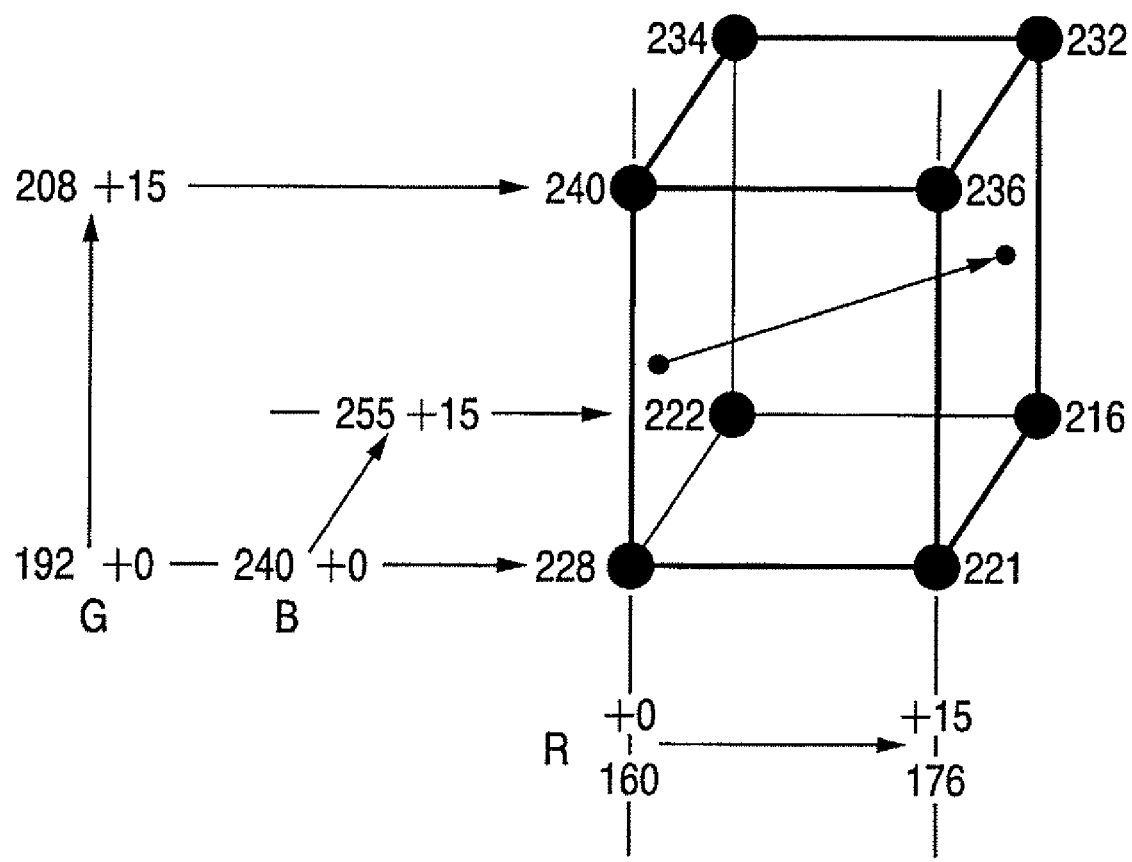
FIG. 14 is a view for explaining an example of inversion of values which are to monotonically change in a color change of gradation upon making interpolation calculations.

FIG. 14 is a view for explaining an example of inversion of values which are to monotonically change in a change in color of gradation upon making interpolation calculations. When an inversion phenomenon has occurred in the gradation object, changes such as color deviations are generated at that position, resulting in noticeable visual deterioration of image quality.

In practice, a case will be explained below wherein inversion takes place due to calculational errors by interpolation calculation in the color matching processing, while expressing in specific figures. A case will be explained wherein output data of a green channel of a color LUT is calculated by 8-point interpolation arithmetic processing of 8-bit precision. As shown in FIG. 14, assume that grid data as the coordinates on the input side of the color LUT have values "160" and "176" at grid points on the R-axis, values "192" and "208" at grid points on the G-axis, and values "240 and "255" at grid points on the B-axis. Data on the grids are as shown in FIG. 14.

When gradation data that passes through an LUT grid changes from (R, G, B)=(159, 199, 251) to (R, G, B)=(175, 207, 251), this green output value obtained by converting the gradation data is expected to have a monotonic increase. This is because the comparison of end values reveal that the values have increased. As the definition of gradation, it is expected that a change such as an increase or decrease is maintained at least in this grid. In many cases, a calculation result that meets one's expectations is obtained.

However, upon making arithmetic operations with 8-bit integer type precision, the occurrence of an inversion phenomenon is confirmed as in the following arithmetic results. More specifically, when interpolation calculations are implemented by 8-point interpolations, and calculations are made to convolute the interpolation dimensions in the order of R→G→B, an output value G in this grid becomes lower than the previous pixel value when the input values are 168, 203, and 251. This is a calculation result which demonstrates that an inversion has occurred.

<Arithmetic Results>
Input Values Output Value G
167, 203, 251 ⇒ 230
168, 203, 251 ⇒ 229 (inversion has occurred)
168, 204, 251 ⇒ 230

Therefore, upon creating gradation by color matching processing as a combination of an LUT and interpolation calculations, the created gradation approaches correct values from the viewpoint of a color reproduction, but an inversion phenomenon occurs due to the influence of quantization errors, thus producing visual deterioration.

As described above, in the case of the gradation object, there are two methods: the method of processing on the device color space and the method of processing on the color space (rendering color space or the like) that defines gradation before color matching for the gradation object. However, these processing methods have both merits and demerits.

The gradation processing of the third embodiment inputs color information at start and end points of the gradation object, and the number of pixels to be generated (depending on the device resolution) in the gradation object as input parameters.

After reception of the input parameters, the gradation processing examines the trend of changes in color values of gradation data in a cube of color LUT of interest. Furthermore, the gradation processing checks the presence/absence of inversion based on the trend changing, and executes inversion correction processing if an inversion is found.

The processing (trend inspection) of detecting a change direction (monotonic increase or decrease) of color values in a cube of a color LUT (to be referred to as a color cube hereinafter) will be described in detail below.

Gradation data correspond to a data group which linearly and continuously change inside or on the surface of the color cube. Assuming that gradation data are input now, the data group becomes data which passes across a plurality of color cubes which are allocated on the gradation color space at equal intervals. Upon passing across one color cube, data enters the color cube from an entrance, and leaves the color cube from an exit.

Figure 15:
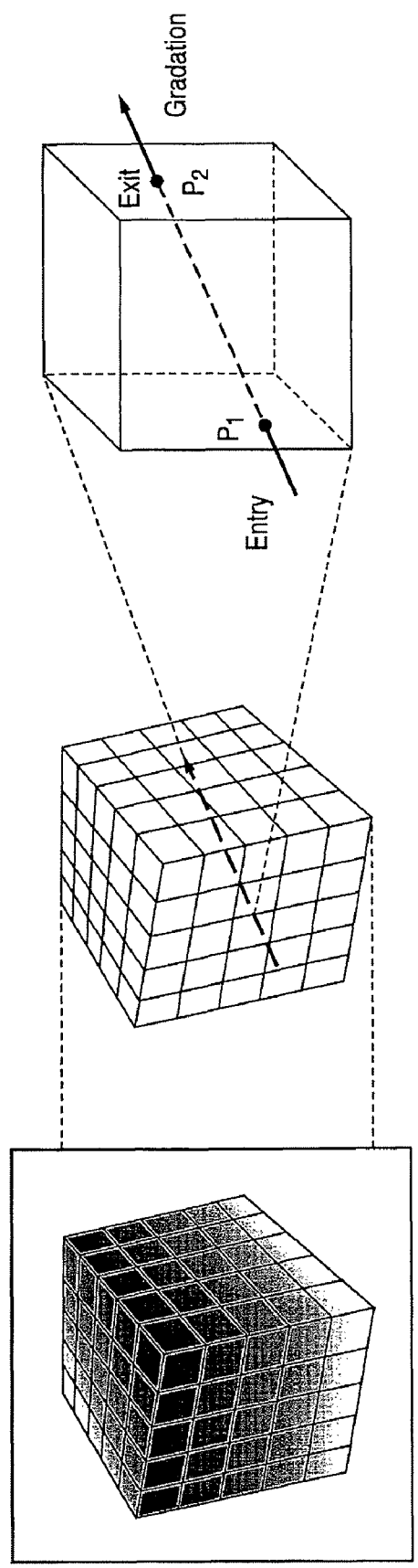
FIG. 15 is a view showing a state wherein gradation data enters a color cube from an entrance and leaves the color cube from an exit.

FIG. 15 shows a state wherein gradation data enters a color cube from an entrance, and leaves the color cube from an exit.

Figure 16:
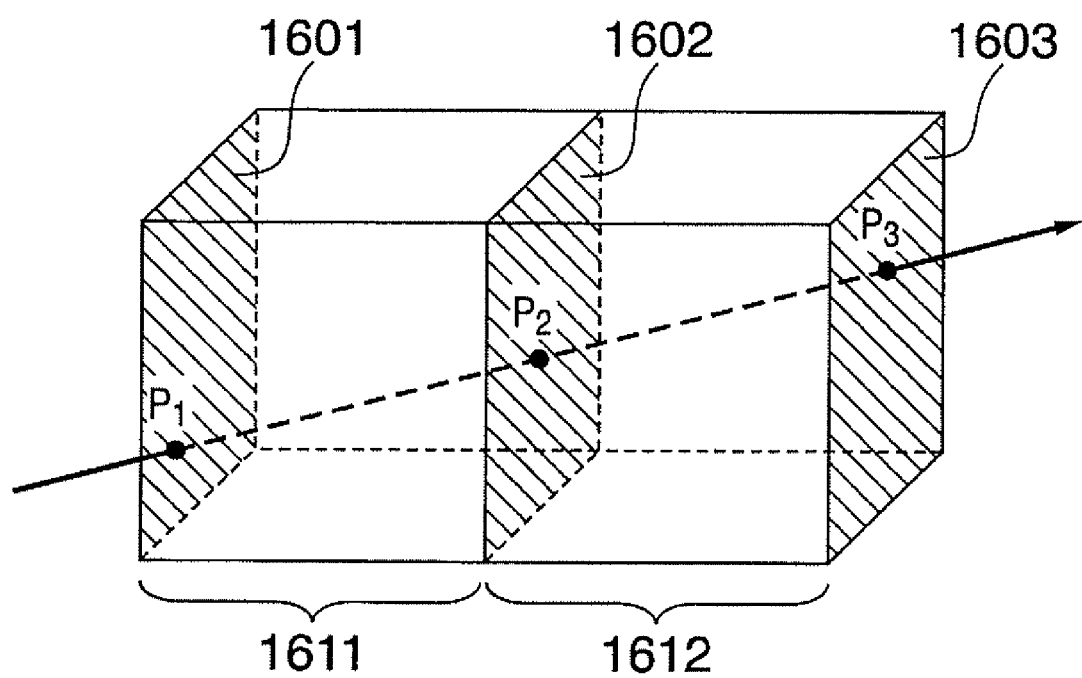
FIG. 16 shows a state wherein one gradation data passes over a plurality of color cubes.

FIG. 16 shows a state wherein one gradation data passes over a plurality of color cubes. As shown in FIG. 16, the intersections of the color cube of the gradation exist on grid planes 1601 to 1603. Note that the coordinate values of intersections $P_1$, $P_2$, and $P_3$ can be obtained by calculations.

Next, in color cubes 1611 and 1612, the upward or downward trends of respective values are determined. Some methods of determining trends may be used. The third embodiment calculates respective values at the intersections of the entrance and exit on the grid plane, and then calculates their difference to determine a trend. More specifically, as shown in FIG. 16, values at the entrance $P_1$ on the grid plane located at the left end and at the exit $P_2$ on the grid located at the right end are calculated by linear interpolation calculations based on values on grids which form the color cube 1611. Let $q_1$ and $q_2$ be the values obtained by this color matching processing. Then, the difference between these values is calculated as "Trend".

$$q_1 = CMS(p_1)$$

$$q_2 = CMS(p_2)$$

$$\text{Trend} = (q_2 - q_1)$$

If the calculation result of the trend is a positive value, the trend is an upward trend; if it is a negative value, the trend is a downward trend. If the calculation result is "0", since it belongs to neither the upward trend nor downward trend, "no trend" is defined. Note that the trend may be obtained from the difference between $P_1$ and $P_2$ before color matching.

Figure 17:
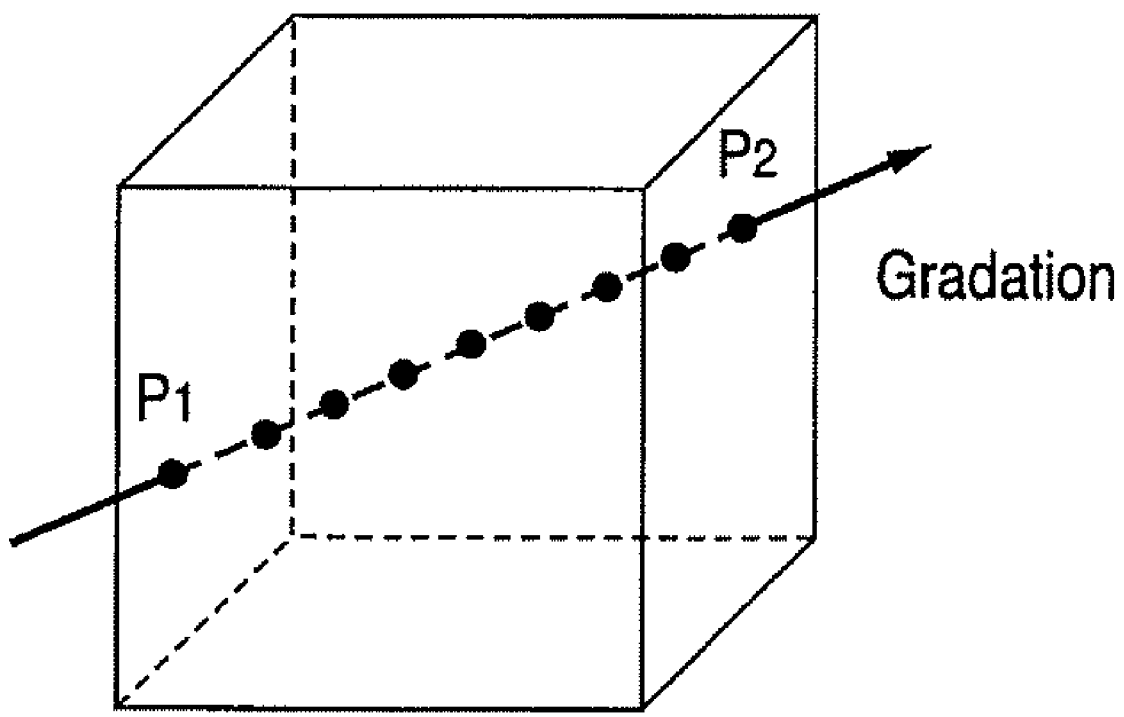
FIG. 17 is a view for explaining correction processing inside a color cube on an upward trend.
Figure 18:
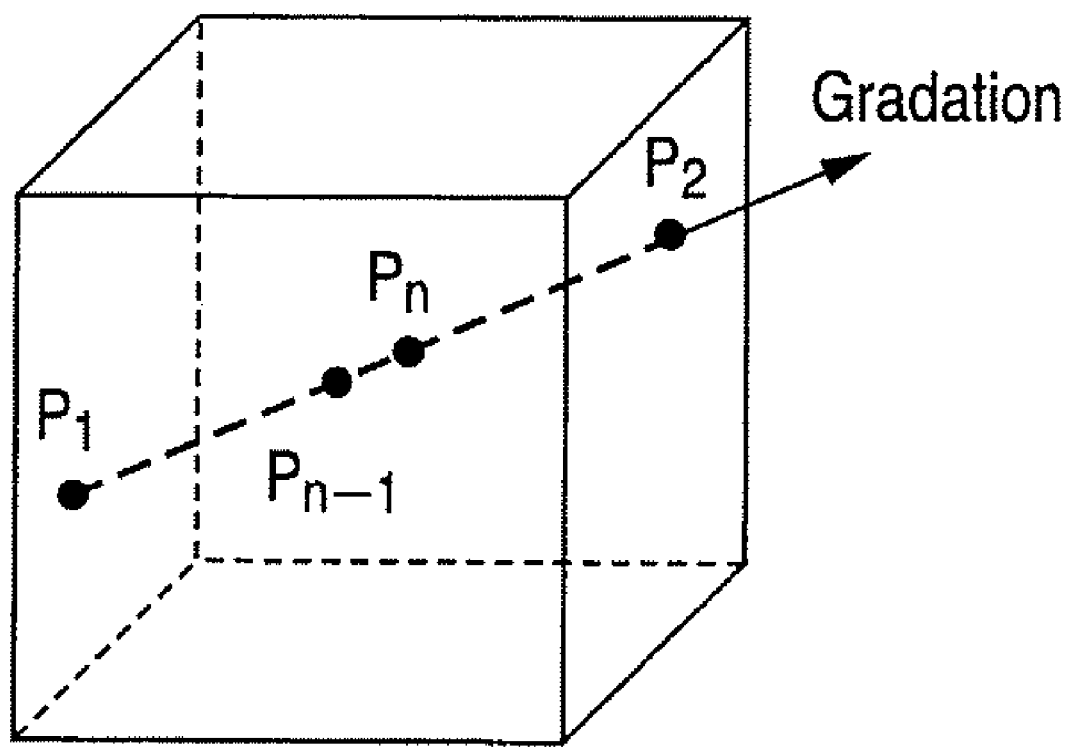
FIG. 18 is a view for explaining correction processing inside a color cube on an upward trend.

The correction processing inside the color cube upon an upward trend will be described below using FIGS. 17 and 18. As described above, after determination of the trend in the color cube, color values inside the color cube are calculated in turn, as shown in FIG. 17, so as to generate a gradation. The color values are obtained by calculating pixel values at a granularity depending on the device resolution. Each pixel value can be calculated by interpolation calculations. However, each individual value is often calculated to independently have a quantization error, and becomes inverted data in some cases. In order to avoid such state, although the obtained trend is an upward trend as shown in FIG. 18, when a color value calculated at $P_n$ is lower than that calculated at $P_{n-1}$, it is determined that inversion has occurred, and the color value at $P_{n-1}$ is adopted in place of that at $P_n$. That is, inversion correction processing for correcting inversion is executed.

Figure 19:
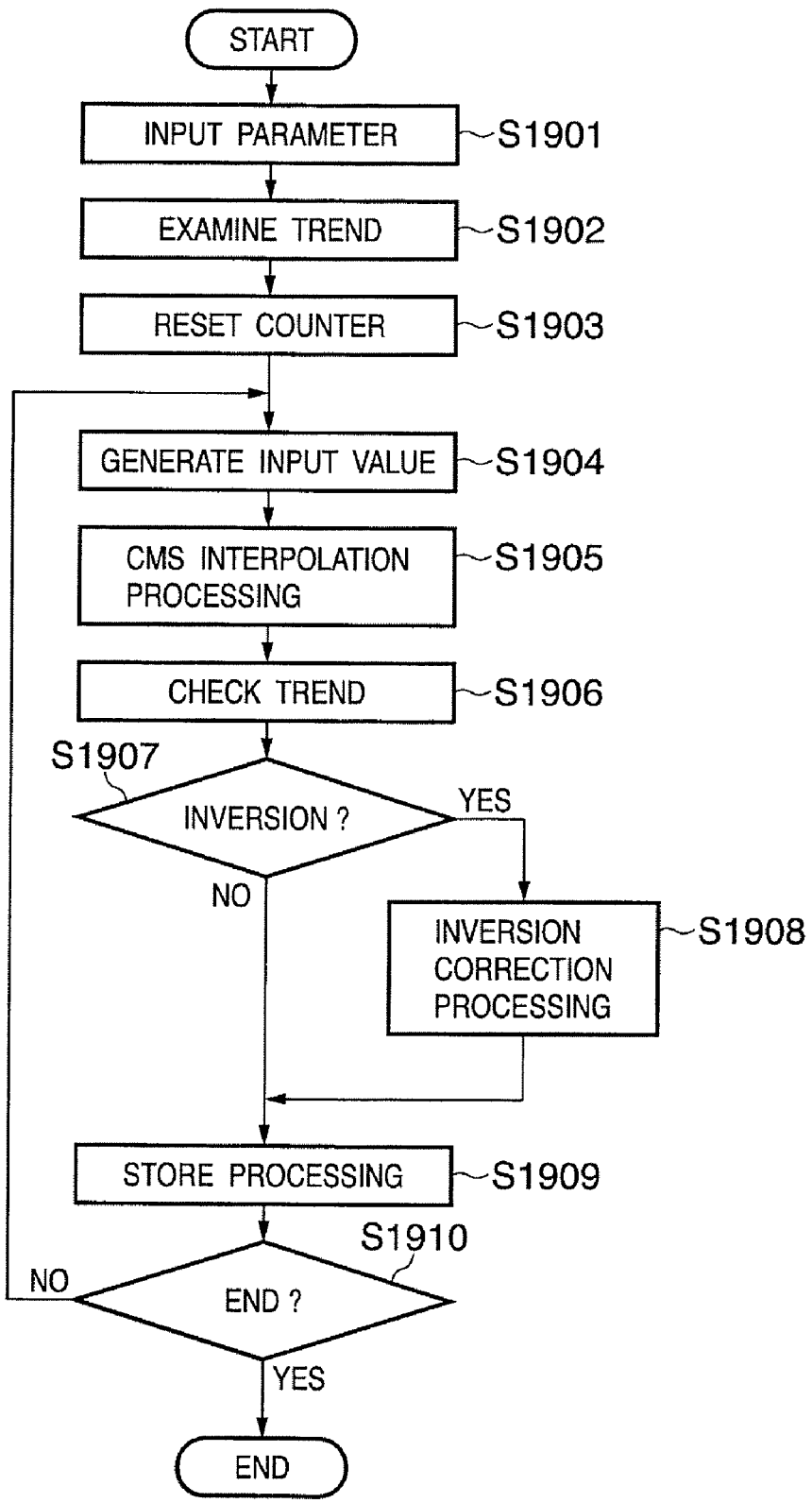
FIG. 19 is a flowchart showing inversion correction processing according to the third embodiment.

FIG. 19 is a flowchart showing the series of processes. The processes of this flowchart will be described below. In step S1901, parameters are input. The parameters include the color at the start point, that at the end point, and the designated number of pixels required for a gradation object. In step S1902, a plurality of color cubes over which designated gradation data passes is specified based on the color values designated at the start and end points designated in the parameters. The trend of gradation data is checked for each color cube. That is, the difference between the entrance $P_1$ and exit $P_2$ on a grid surface is obtained. Next, in step S1903 the value of a counter used in loop control is reset to repeat loop processing in step S1904 and subsequent steps as many as the number of pixels of the gradation object designated in the parameters.

In step S1904, input values of the current gradation color are calculated based on the start point color, end point color, and counter value. At this time, in order to improve precision, cast processing is executed to hold data with a precision of preferably 8 bits or more (16 bits in this example). In step S1905, color conversion processing (color matching) is executed. In this step, interpolation arithmetic processing is executed with precision of 16 bits. In step S1906, trend data in the color cube to which the color which has undergone current color matching belongs is checked based on the trend inspection result in step S1902, and the change in signal values of the pixels which have undergone current color matching and the pixels which have undergone immediately preceding color matching.

The presence/absence of an inversion is checked in step S1907 based on the check result. If inversion is found, the process advances to step S1908; otherwise, the process advances to step S1909. In step S1908, the aforementioned inversion correction processing is executed. In step S1909, store processing is executed. Note that this store processing includes bit adjustment (cast processing) as needed. For example, when 8-bit data is required as an output, rounding processing from 16 bits to 8 bits is executed at that time.

It is checked in step S1910 if the counter value has reached the required number of pixels of the gradation object. If the counter value has not reached the required number of pixels yet, the process returns to step S1904 to repeat the aforementioned processing. If the counter value has reached the required number of pixels of the gradation object, this processing ends.

Figure 20:
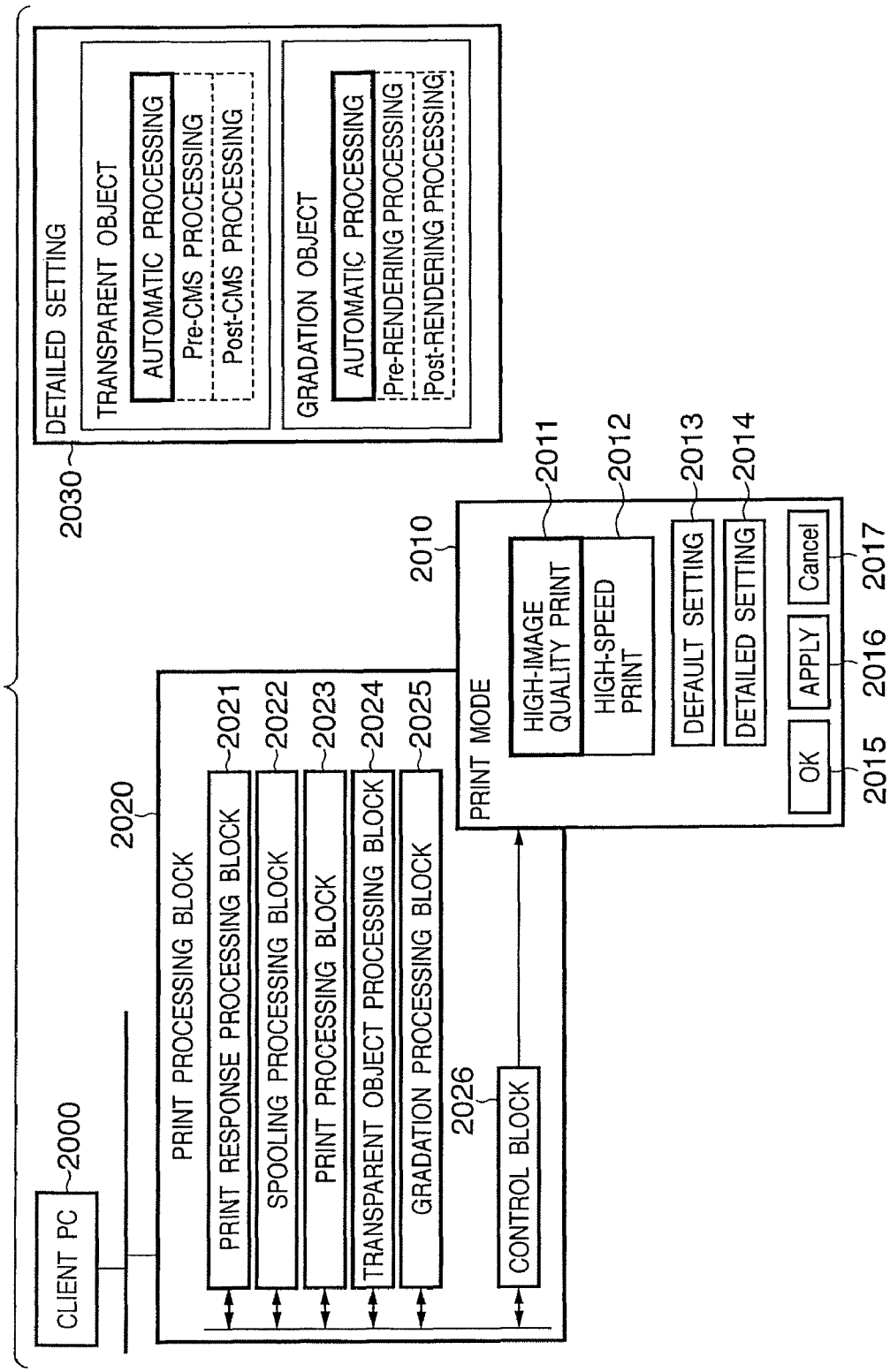
FIG. 20 shows an example of the arrangement of a print processing block and a setting dialog of a UI setting unit according to the third embodiment.

The arrangement of a print processing block and setting dialogs of a UI setting unit in the third embodiment will be described below using FIG. 20. Note that the third embodiment allows the user to select one of two print modes (high-image quality print mode 2011 and high-speed print mode 2012) as in the first and second embodiments. A detailed setting item dialog 2030 displayed upon pressing of a detailed setting button 2014 is also the same as that in the second embodiment.

When the user selects the high-image quality print mode, α blend objects and a gradation object are rendered on the RGB color space (rendering color space), and the above-described color matching processing is applied for each pixel. In this case, in the processing of the gradation object, after detection of an inversion in consideration of the trend as described above, the correction processing is executed for the inversion.

On the other hand, when the user selects the high-speed print mode, α blend objects are rendered on the RGB color space (rendering color space), and a gradation object is rendered on the CMYK color space (device color space). In this case, as in the second embodiment, the gradation formation processing adopts color matching processing for only end points (start point, end point, a plurality of divided points between these points, or the like) of the gradation, and forms an intermediate gradation by interpolation processing on the CMYK color space. Since color matching is not applied to the gradation object for each pixel with interpolation processing, high-speed processing can be executed.

As described above, upon printing a gradation object with high image quality, the third embodiment can make strictly correct color reproduction without any inversion, and form smoother gradation than the second embodiment. Since the second embodiment does not have any means for correcting the gradation formed on the rendering color space, the gradation formed on the device color space is converted to have high image quality.

However, in the third embodiment, the color space to be applied is reversed since higher image quality is assured by providing means for correcting the gradation on the rendering color space rather than that formed on the device color space.

To restate more simply, gradation has higher image quality in the following order:

1. Gradation formed on the rendering color space+presence of correction means

2. Gradation formed on the device color space

3. Gradation formed on the rendering color space+absence of correction means

The system of the third embodiment includes 1 and 2 above, and that of the second embodiment includes 2 and 3 above.

According to the third embodiment, smooth gradation on the rendering color space can be implemented more satisfactorily.

Fourth Embodiment

The fourth embodiment of the present invention will be described in detail hereinafter with reference to the accompanying drawings. The basic arrangement of the fourth embodiment is substantially the same as that in the third embodiment, except that the interpolation method upon executing color matching processing is switched. Normally, the color matching processing accesses a color LUT to search for a cube of interest based on input values, obtains information of an output value based on points which form the cube, i.e., grids, and then calculates an output value corresponding to the input point by linear interpolation calculations.

Note that the interpolation calculations roughly include two methods. One method is an 8-point interpolation method, which sequentially drops the dimensions, as shown in FIGS. 5A and 5B. The other method is a 4-point interpolation method. Since this method is known to those who are skilled in the art, an illustration thereof will be omitted, but this method linearly calculates based on four points. In general, one pays little attention to the difference between arithmetic results due to two different interpolation methods. However, in practice, the difference between the arithmetic results is surprisingly large. As a result of examination of a more preferred interpolation method in terms of image quality upon forming a gradation object, it is found that the 8-point interpolation method is the best. However, even with the 8-point interpolation method, it is revealed this time that an output value which is to increase monotonically is inverted due to the influence of errors (quantization errors) upon numeric operations.

This 8-point interpolation method uses fixed points in arithmetic operations, and outputs relatively stable arithmetic values. In case of the 4-point interpolation method, points to be used in arithmetic operations are switched depending on position in a cube. This only results in further arithmetic errors. Upon making experiments that actually form gradation objects, it is found that the gradation object formed by the 8-point interpolation method has higher image quality.

As has been described in the third embodiment, when an inversion part is detected, and correction is applied to that part, the influence of quantization errors can be excluded. However, if the calculation output result as a basic part is unstable, the correction processing does not effectively function.

In terms of image quality, the 8-point interpolation method is the best. Meanwhile, printed materials which place importance on print speed rather than image quality also exist. The 4-point interpolation method can always execute processing at higher speed than the 8-point interpolation method.

Thus, the fourth embodiment allows to appropriately change the interpolation calculation method based on the print mode and user's settings in consideration of the aforementioned problems.

Figure 21:
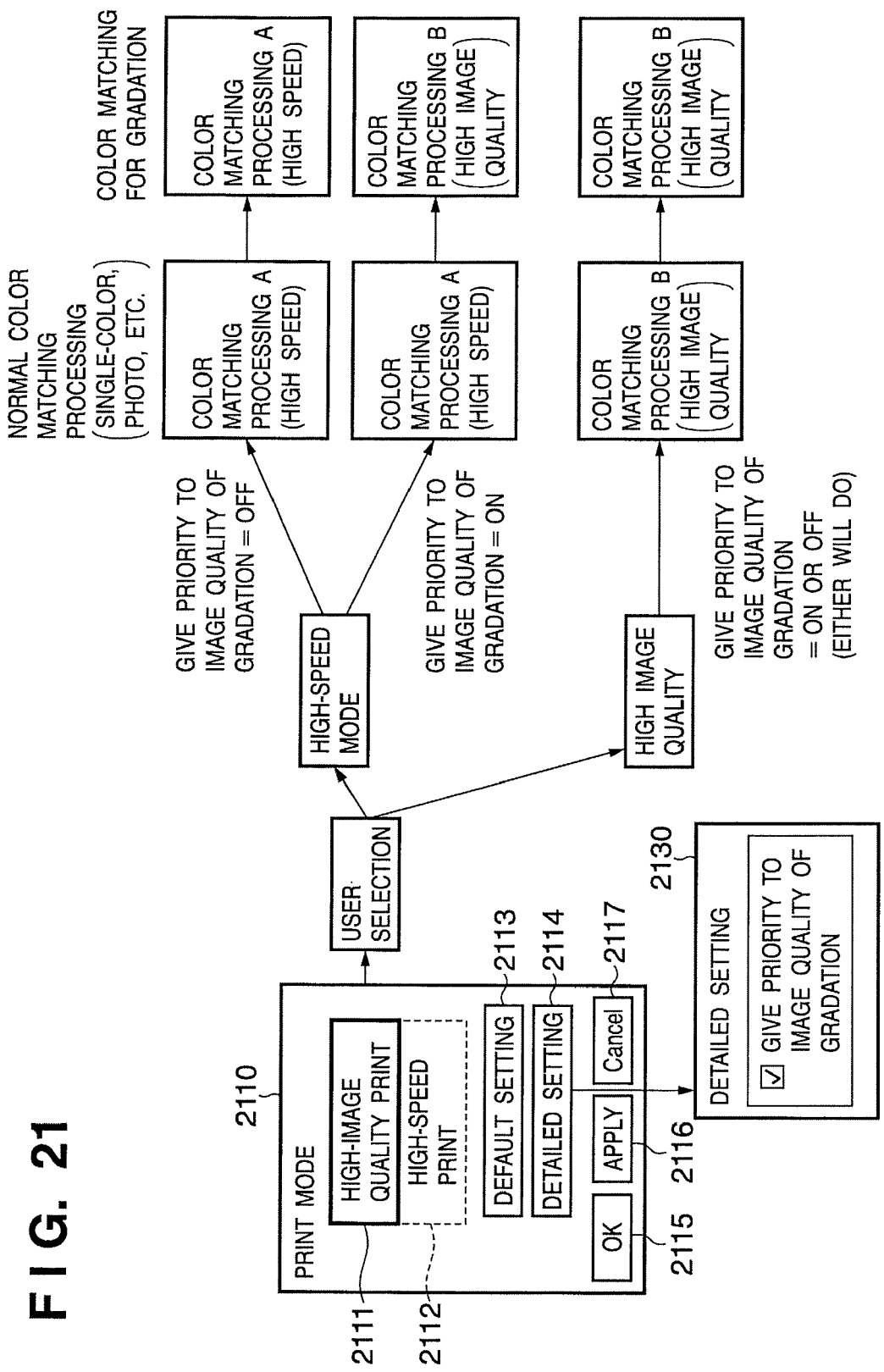
FIG. 21 shows a setting dialog of a UT setting unit according to the fourth embodiment.

FIG. 21 shows a setting dialog of a UI setting unit in the fourth embodiment. The user can select a print mode from a high-speed mode and high-image quality mode. Upon selection of the high-speed mode, whether or not "image quality of gradation prevails" is further examined to switch the interpolation processing method.

Note that color matching processing A (high speed) is an interpolation method using the 4-point interpolation method, and color matching processing B (high image quality) is an interpolation method using the 8-point interpolation method.

As the color matching processing used in a printer of the fourth embodiment, a color matching process which is to be applied to text data, graphics data in solid color, photo data, and the like, and that which is to be applied to a gradation object can be independently set. Normally, the former and latter color matching processes must be matched. If these processes are different, even an identical color is output in different colors due to arithmetic errors and the like produced by different interpolation methods.

Hence, when the user selects the high-speed mode, and does not give priority to image quality of gradation, color matching processing A (high speed), i.e., the interpolation method using the 4-point interpolation method is applied. On the other hand, when the user selects the high-speed mode and wants to print only the gradation object with high image quality, color matching processing B (high image quality), i.e., the interpolation method using the 8-point interpolation method is applied.

On the other hand, when the user selects the high-image quality mode as the print mode, color matching processing B (high image quality), i.e., the interpolation method using the 8-point interpolation method is applied independently of whether or not priority is given to the image quality of gradation.

According to the first and second embodiments, since the color spaces to be applied to respective objects are switched using the color ticket structure, the color space suited to a desired object can be applied. For example, the RGB color space (rendering color space) can be applied to a blend objects, and the device CMYK color space (device color space) can be applied to a gradation object.

In this way, an image obtained by printing the α blend objects can attain color reproduction that matches another device, e.g., a monitor display. As a gradation image, a smooth and fine gradation image free from the influence of quantization errors upon color matching processing can be obtained.

According to the third embodiment, since the RGB color space (rendering color space) is applied to α blend objects as in the first and second embodiments, color reproduction that matches another device, e.g., a monitor display can be attained. The gradation image processing is appropriately switched in accordance with the print mode.

In this way, the third embodiment can solve problems in color reproducibility and accuracy in CMS processing for a gradation object as conventional problems, and can obtain a smooth and fine gradation image free from the influence of quantization errors.

According to the fourth embodiment, a mechanism that switches the interpolation calculations (4-point interpolation or 8-point interpolation) to be applied in the CMS processing is provided, so that CMS interpolation processing for a single-color object, photo image object, and the like, and that for a gradation object can be independently controlled.

Even when the printing system has the arrangement for processing a job in multi-threads inside the printer, color ticket structures are issued for respective job threads, so that the respective threads can operate without interfering with each other.

Upon switching the print mode, e.g., upon using only the RGB color space as the rendering color space in the high-speed print mode, processing can be done without posing any problem by issuing a color ticket with different settings to the job of interest.

Note that the present invention may be applied to either a system constituted by a plurality of devices (e.g., a host computer, interface device, reader, printer, and the like), or an apparatus consisting of a single device (e.g., a copying machine, facsimile apparatus, or the like).

The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which stores the program code constitutes the present invention.

As the recording medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-023627, filed Jan. 31, 2006, and 2006-346655, filed Dec. 22, 2006, which are hereby incorporated by reference herein in their entirety.

What is claimed is:

1. An image processing apparatus comprising:
   discrimination means for discriminating an object of an input print job; and
   color conversion processing means for performing color conversion processing to the object based on a discriminating result of said discrimination means and information which designates color conversion processing set for each print job,
   wherein, when the object is a transparent object, said color conversion processing means executes the color conversion processing on a rendering color space, and when the object is a gradation object, said color conversion processing means executes the color conversion processing on a device color space, and
   wherein, when the object is the gradation object, the object is divided into a plurality of objects, color matching processing is applied to end points of the divided objects, and intermediate pixels are formed on the device color space, and
   wherein, when the object is the gradation object, a parameter used to designate the gradation object is input,
   a data group of the gradation object is formed by color matching processing based on the parameter and a trend changing of color values of the data group is inspected, and
   intermediate pixel values are calculated by an interpolation calculation from the data group, and when the intermediate pixel values do not monotonically increase or decrease according to the trend changing, the intermediate pixel values are corrected to monotonically increase or decrease.

2. The apparatus according to claim 1, further comprising multi-thread processing means for processing the print job in multi-threads,
   wherein the information which designates the color conversion processing is issued for each job thread.

3. The apparatus according to claim 1, wherein an interpolation calculation method to be applied in the color conversion processing is switched in accordance with a print mode and whether or not to prioritize image quality of the gradation object.

4. The apparatus according to claim 1, wherein the parameter includes at least color information of a start point of the gradation object, color information of an end point of the gradation object, and a number of pixels to be generated in the gradation object.

5. The apparatus according to claim 1, wherein the interpolation calculation used to calculate the intermediate pixel values is executed by increasing precision.

6. An image processing method of an image processing apparatus comprising:
   a discrimination step of discriminating an object of an input print job; and
   a color conversion processing step of applying color conversion processing to the object based on a result in the discrimination step and information which designates color conversion processing set for each print job,
   wherein the color conversion processing step includes a step of executing, when the object is a transparent object, the color conversion processing on a rendering color space, and executing, when the object is a gradation object, the color conversion processing on a device color space, and
   wherein, when the object is the gradation object, the object is divided into a plurality of objects, color matching processing is applied to end points of the divided objects, and intermediate pixels are formed on the device color space, and
   wherein, when the object is the gradation object, a parameter used to designate the gradation object is input,
   a data group of the gradation object is formed by color matching processing based on the parameter and a trend changing of color values of the data group is inspected, and
   intermediate pixel values are calculated by an interpolation calculation from the data group, and when the intermediate pixel values do not monotonically increase or decrease according to the trend changing, the intermediate pixel values are corrected to monotonically increase or decrease.

7. A program, recorded on a computer-readable recording medium, for making a computer execute respective steps of the processing method of the image processing apparatus according to claim 6.

8. An image processing method comprising:
   a step of performing color matching processing to a data group corresponding to a gradation object;
   a step of detecting a trend changing of color to the data group based on a result of the color matching processing to obtain an intermediate pixel by an interpolation calculation from the data group; and
   a step of correcting a value of the intermediate pixel when a value of the intermediate pixel does not monotonically increase or decrease according to the trend changing.

9. The method according to claim 8, wherein the color matching processing is performed in accordance with a color ticket issued by an instruction from a user interface.

10. The method according to claim 8, wherein the interpolation calculation method to be applied in the color matching processing is switched in accordance with a print mode and whether or not to prioritize image quality of the gradation object.

11. An image processing apparatus comprising:
   means for performing color matching processing to a data group corresponding to a gradation object;
   means for detecting a trend changing of color to the data group based on a result of the color matching processing, and for obtaining an intermediate pixel by an interpolation calculation from the data group; and
   means for correcting a value of the intermediate pixel when a value of the intermediate pixel does not monotonically increase or decrease according to the trend changing.

12. The apparatus according to claim 11, wherein an interpolation calculation method to be applied in the color matching processing is switched in accordance with a print mode and whether or not to prioritize image quality of the gradation object.

13. The apparatus according to claim 11, wherein the color matching processing is performed in accordance with a color ticket issued by an instruction from a user interface.

* * * * *